(12) United States Patent
Zisow

(10) Patent No.: US 12,145,504 B1
(45) Date of Patent: Nov. 19, 2024

(54) LASER POINTER PARKING ALIGNMENT SYSTEM AND APPARATUS

(71) Applicant: David Zisow, Baltimore, MD (US)

(72) Inventor: David Zisow, Baltimore, MD (US)

( * ) Notice: Subject to any disclaimer, the term of this patent is extended or adjusted under 35 U.S.C. 154(b) by 0 days.

(21) Appl. No.: 18/617,126

(22) Filed: Mar. 26, 2024

Related U.S. Application Data

(60) Provisional application No. 63/614,689, filed on Dec. 26, 2023.

(51) Int. Cl.
*B60Q 9/00* (2006.01)
*B60Q 3/51* (2017.01)
*G08G 1/16* (2006.01)

(52) U.S. Cl.
CPC ............ *B60Q 9/006* (2013.01); *B60Q 3/51* (2017.02); *G08G 1/168* (2013.01)

(58) Field of Classification Search
None
See application file for complete search history.

(56) References Cited

U.S. PATENT DOCUMENTS

| | | | |
|---|---|---|---|
| 5,208,586 A * | 5/1993 | Friberg | E04H 6/426 340/932.2 |
| 6,040,787 A | 3/2000 | Durham | |
| 6,184,800 B1 * | 2/2001 | Lewis | B60Q 1/48 116/202 |
| 6,191,706 B1 * | 2/2001 | Kositkun | E04H 6/426 340/552 |
| 6,772,525 B2 * | 8/2004 | Newcomer | G01C 15/00 33/286 |
| 6,853,313 B2 * | 2/2005 | Newcomer | G08G 1/161 340/555 |
| 6,946,973 B1 * | 9/2005 | Yanda | H01R 33/94 340/932.2 |
| 7,573,402 B2 * | 8/2009 | Herbert | G01S 17/46 340/556 |
| 7,812,742 B2 * | 10/2010 | Pankowski | E04H 6/426 116/28 R |

(Continued)

FOREIGN PATENT DOCUMENTS

| | | | | |
|---|---|---|---|---|
| CN | 114783248 A | * | 7/2022 | ............ G01S 17/06 |
| CN | 115662147 A | * | 1/2023 | |
| JP | 2021095548 A | * | 6/2021 | |

*Primary Examiner* — Fekadeselassie Girma

(74) *Attorney, Agent, or Firm* — John Rizvi; John Rizvi, P.A.—The Patent Professor®

(57) ABSTRACT

A laser pointer parking alignment system comprises a laser pointer parking alignment apparatus, a fixation means for attaching the apparatus to a vehicle dashboard, a stationary target configured for removable securement to a surface such as a garage wall; and instructions for installation, use and maintenance. The apparatus comprises a laser pointer device removably securable in a laser device mount removably mounted on a vehicle dashboard, configured to assist in parking a vehicle. The stationary target has a surface capable of reflecting a laser beam emitted by the laser pointer device, for positioning the vehicle in a parking space such as a garage or the like. A user may line the laser pointer device up with a midpoint of the middle portion of the garage wall; and align the vehicle with the midpoint. The system provides an unprecedented, simple, effective solution for aligning and positioning a vehicle in any garage.

20 Claims, 30 Drawing Sheets

(56) References Cited

U.S. PATENT DOCUMENTS

| | | | |
|---|---|---|---|
| 8,077,054 B1* | 12/2011 | Aarons | E04H 6/426 |
| | | | 116/28 R |
| 8,810,433 B1* | 8/2014 | Aarons | E04H 6/426 |
| | | | 116/28 R |
| 8,981,965 B2 | 3/2015 | Hider et al. | |
| 10,106,081 B2* | 10/2018 | Lu | G05D 1/024 |
| 10,145,981 B2* | 12/2018 | Grisak | G01V 8/14 |
| 10,464,606 B2* | 11/2019 | Griffith | G05D 1/0246 |
| 11,804,688 B1* | 10/2023 | Coyle | H01S 3/0405 |
| 2002/0011938 A1* | 1/2002 | Krieger | B60Q 9/004 |
| | | | 340/425.5 |
| 2004/0163265 A1 | 8/2004 | Helms | |
| 2005/0099821 A1 | 5/2005 | Potter et al. | |
| 2005/0134482 A1* | 6/2005 | Li | B60Q 9/007 |
| | | | 340/932.2 |
| 2007/0046500 A1* | 3/2007 | Herbert | G08G 1/168 |
| | | | 340/932.2 |
| 2011/0199234 A1 | 8/2011 | Butler, III et al. | |
| 2012/0133527 A1* | 5/2012 | Lin | E04H 6/426 |
| | | | 340/932.2 |
| 2017/0021767 A1* | 1/2017 | Lu | G05D 1/024 |
| 2017/0307148 A1* | 10/2017 | Sharrah | F21L 4/045 |
| 2018/0281858 A1* | 10/2018 | Griffith | G05D 1/0246 |
| 2023/0307884 A1* | 9/2023 | Hatori | H01S 5/02255 |

* cited by examiner

LASER POINTER PARKING ALIGNMENT SYSTEM AND APPARATUS

CROSS-REFERENCE TO RELATED APPLICATIONS

This application claims the benefit of U.S. Provisional Patent Application No. 63/614,689 filed on Dec. 26, 2023, which is incorporated by reference herein in its entirety.

FIELD OF THE INVENTION

The present invention relates generally to optical signaling devices for vehicles for parking, and more particularly to a laser pointer parking alignment system and apparatus.

BACKGROUND OF THE INVENTION

Existing laser-guided garage parking devices focus on determining how close a vehicle is to a back wall of a parking area or edifice as opposed to centering of the vehicle in a parking area. Therefore existing solutions are insufficient and do not solve the problem of parking conventional vehicles such as automobiles in a narrow or limited space.

For example, existing options include visual parking aids for determining how close a vehicle is to a back wall may include a laser pointer supported by a mounting bracket configured for removable attachment to the interior of a vehicle windshield. The laser has a power source that prevents the laser from operating unless the laser is correctly positioned upon the mounting bracket affixed to the windshield. In use, the laser is focused forward from the vehicle so that it displays an image on the wall surface in front of the moving vehicle. As the vehicle approaches the wall, the image on the wall surface descends until it reaches a predetermined stopping point, informing the driver that they have reached a proper parking position. Significant drawbacks are caused by the laser power source preventing operation of the device if the laser is not correctly positioned upon the mounting bracket, and by the lack of stability of the required position of the mounting bracket on a windshield which causes frequent operational failures. Use of this type of device is therefore unreliable and potentially unsafe.

Another option relates to a device which uses two laser beams to assist in parking a vehicle having a windshield at a desired distance relative to a surface forward of the vehicle, such as the wall of a garage. Independent adjustment means are necessary to enable angling of the first and second beams so as to converge in a localized region of the surface forward of the vehicle when the vehicle is positioned at a desired distance. Such a configuration requires an enclosure with a visor mount to position the first and second beams to pass through the windshield, and requires actuation by the user of a contact button on the enclosure to activate the laser and by squeezing the device enclosure against the visor. A mirror, prism or other light re-directing element is provided in the enclosure in the path of one of the first and second beams prior to exiting enclosure causing the two beams to converge in a localized region of the wall when the vehicle is parked at a desired distance therefrom. The mirror must work with a beam splitter disposed on an independently adjustable mounts to assist in fixing the desired distance. An optional lens may be disposed in the path of one of the first and second beams causing that beam to form a line on the surface forward of the vehicle. The multiple separate components on multiple mounts adds an element of complication to the use of this type of device. Further, the requirement that operation of the device by manual operation of the contact button and manually squeezing the enclosure is not only complicated, but also unsafe given the operation of the device occurs while the user is operating a vehicle.

Another existing option which does not work well is a vehicle guidance and parking system that continuously guides the operator of a vehicle to a pre-determined parking position by using two laser beams impinging on a forward or rearward surface. The two laser beams project to a substantially vertical surface to which a vertical line has been applied and the vehicle is guided by the operator such that the two laser beams are kept equidistantly horizontally centered around the line during the vehicle approach to maintain the correct lateral position in the pre-determined parking position. When the two laser beams converge on the vertical line, the vehicle is longitudinally positioned to the pre-determined parking position. Temperature compensation, due to the wide temperature of potential use range, must be provided by the laser emitting device used in the vehicle guidance and parking system. Further, a light blocking shroud is required for use in bright sunlight conditions which must be used around the vertical line to improve the visibility of the two laser beam outputs for vehicle maneuvering. The complicated use and operation under both temperature dependent and light dependent conditions make this option problematic.

Another option which fails to provide an adequate solution provides a slide-out parking indicator apparatus to assist in parking a large or oversized vehicle such as a recreational vehicle (RV) which comprises a complicated deployable extension which may include a footing arm and leg coupled to the vehicle exterior, and at least one housing coupled to an exterior side of the vehicle. At least one laser is coupled to each housing that is configured to emanate light that impinges on a surface peripheral to the vehicle to indicate a target on the surface and a proximity to a boundary. This complicated solution is directed to larger vehicles such as RVs, trucks, back hoes or the like and has no applicability or utility in parking a conventional automobile in a tight space.

Ideally, it would be extremely useful to be able to easily park a conventional passenger vehicle (automobiles such as 2-door vehicle, 4-door vehicle, convertible, compact, sedan, station wagon, SUV, van, or the like) in a garage by receiving assistance from a device that is simple and easy to safely operate while operating a vehicle. Accordingly, there is a need for a solution to at least one of the aforementioned problems. For instance, there is an established need for a laser pointer parking alignment apparatus which may be easily and removably installed in a conventional passenger vehicle, which is durable and reliable, and easy to operate, which does not require multiple complex parts to install or utilize the device.

SUMMARY OF THE INVENTION

The present invention is directed to a laser pointer parking alignment system and apparatus which can be removably mounted on a vehicle dashboard for use to assist in parking a vehicle in a given space, for example without limitation, a garage or another space. The present invention further provides a laser-guided method for parking.

The laser pointer parking alignment system comprises a laser pointer parking alignment apparatus, a fixation means for attaching the apparatus to a vehicle dashboard, a stationary target configured for removable securement to a surface such as a garage wall; and instructions for installation and use. The apparatus comprises a laser pointer device removably securable in a laser device mount which is removably mounted on a vehicle dashboard to assist in parking a vehicle. The stationary target has a surface capable of reflecting a laser beam emitted by the laser pointer device, for positioning the vehicle in a parking space such as a garage or the like. A user may line the laser pointer device up with a midpoint of the middle portion of the garage wall; and align the vehicle with the midpoint. The system provides an unprecedented, simple, effective solution for aligning and positioning a vehicle, such as for example without limitation, conventional passenger automobiles such as 2-door vehicle, 4-door vehicle, convertible, compact, sedan, station wagon, SUV, van, or the like in any garage or tight parking space.

Some garages are very small. Some garages are used for storage, which leaves a smaller parking area. Some two car garage spaces have a vertical structural member between them, leaving very little space to park a vehicle. Similarly garages with several garage spaces have multiple vertical structural members. The existence and location of vertical structural members make it quite difficult for even highly skilled drivers to park their vehicle. The laser-guided apparatus and system of the present invention enable a vehicle operator to easily center a vehicle in a given space.

The laser pointer parking alignment system of the present invention may be used to calculate the center of a predetermined space and enable the vehicle operator to successfully enter the space with the car centered in the space. A vertical center line may be drawn against a targeted back wall of the garage. A marker may then be placed along the vertical center line of the targeted wall. The laser pointer apparatus may be mounted on the dashboard of the vehicle. The laser pointer device lets the user know how close the center of the vehicle is to the center line marker. This provides the ideal location to park a car in a garage, and may be beneficially used to align and position a vehicle in a garage which has a narrow opening, or a small entry clearance. The system assists a user in avoiding vehicle damage such as scratches, dents, mirror breakage and the like. The system further improves safety of the user. The system may be beneficially used by all drivers, and may be particularly helpful for drivers who generally have difficulty getting a vehicle into a garage or parking space.

In a first implementation, the laser pointer parking alignment system comprises:

a laser pointer parking alignment apparatus comprising a laser pointer device capable of emitting a laser beam; and a laser device mount configured for removable securement to a vehicle dashboard surface and configured to securely removably receive the laser pointer device on an upper surface thereof;

a fixation means for attaching the laser device mount to the dashboard, the fixation means being configured to for securement to a bottom surface of the laser device mount, and to the vehicle dashboard surface;

a stationary target configured for removable securement to a surface of a structure, the stationary target having a surface capable of reflecting the laser beam for positioning the vehicle; and a series of system instructions for a user to follow to install and use the system.

In one aspect, the laser pointer parking alignment system comprises:

a laser pointer parking alignment apparatus comprising a laser pointer device capable of emitting a laser beam;

and a laser device mount configured to be securely and removably mounted on a vehicle dashboard, the laser device mount having an upper surface configured to securely removably receive the laser pointer device;

a suitable fixation means/device for attaching the laser device mount to the dashboard, such as a hook and loop fastening assembly or the like (nonlimiting example of which is Velcro® assembly), the fixation means being configured to be secured to a bottom surface of the laser device mount, and to an upper surface of the vehicle dashboard;

a stationary target configured for removable securement to a surface of a structure such as a garage wall, or other suitable structure including but not limited to a garage shelf or the like, the stationary target having a surface able to reflect the laser beam for positioning the vehicle; and a series of system instructions.

In one aspect, the present invention provides a laser-guided system (laser pointer system) for parking alignment which comprises:

a laser pointer device capable of emitting a laser beam;

a laser device mount configured to be securely and removably mounted on a vehicle dashboard, and having an upper surface configured to securely removably receive the laser pointer device;

a suitable fixation means/device for attaching the laser device mount to the dashboard; and a stationary target configured for removable securement to a surface of a structure.

In one aspect, the laser device mount is positioned on the dashboard perpendicular to a midpoint line of a windshield of the vehicle so the laser pointer device is positioned perpendicular to the midpoint line which connects a vehicle rearview mirror at the midpoint.

In one aspect, the fixation means/device may comprise a hook and loop fastening assembly or the like, a nonlimiting example of which is a Velcro® assembly.

In one aspect, the fixation means is configured to be secured to a bottom surface of the laser device mount, and to an upper surface of the vehicle dashboard.

In one aspect, the surface of the structure comprises a surface of a garage wall.

In one aspect, the surface of the structure comprises a garage wall, or any other suitable structure including but not limited to a garage shelf or the like.

In one aspect, the stationary target comprises a surface able to reflect the laser beam for positioning the vehicle.

In one aspect, the stationary target may comprise a lower main body and an upper reflective surface. The upper reflective surface may be laminated or adhesively affixed to at least a portion of the lower main body. In some embodiments, the upper reflective surface may cover a portion of the lower main body. In other embodiments, the upper reflective surface may cover the entire lower main body.

In a second implementation the present invention provides a method for using a laser pointer parking alignment system. Previous laser-guided garage parking devices focus on determining how close the vehicle is to the back wall. In one aspect, the laser-guided system of the present invention may be used to center a vehicle in a given parking space. Some two car garage spaces have a vertical structural member between them, leaving very little space to park a vehicle. The laser-guided system centers the vehicle in a given space. The center of a predetermined parking space is calculated (i.e., the space required for a vehicle to successfully enter the parking space). A vertical center line is drawn against the back wall of the garage. A marker (stationary target) is placed along the vertical center line of the targeted wall. A laser pointer apparatus is mounted on the dashboard of the vehicle. The laser pointer apparatus includes a laser pointer device configured to let a user know how close the center of the vehicle is to the center line marker (stationary target). This provides the user the ideal location to park a car in the parking space in a garage and guides the user in positioning the car in the parking space.

In one aspect, the laser pointer device is positioned perpendicular to a line that connects the mirror at the midpoint.

In one aspect, the stationary target of the system is configured to be mounted on an innermost garage interior wall distal to the garage opening and garage door. The stationary target may be positioned at a middle portion of the garage interior wall. The stationary target may comprise a marker or a strip of material which may be mounted or adhered to the wall surface, or any suitable surface such as, for example without limitation, a shelving surface.

In one aspect, the stationary target comprises a target upper reflective surface that is capable of reflecting a laser beam emitted/transmitted from the laser pointer device.

In one aspect, to use the system, a user may line the laser pointer device up with a midpoint of the middle portion of the garage wall; and align the vehicle with the midpoint.

In one aspect, the system comprises at least one system digital display panel configured to display the distance to the stationary target and the rear garage wall as a user enters a garage with the laser beam aimed at the stationary target on the rear garage wall.

In one aspect, the at least one system digital display is configured to display the distance between the vehicle and the stationary target located at the rear garage wall, a distance from a right side view mirror of the vehicle to a right side wall of the garage and a distance from a left side view mirror of the vehicle to a left side wall of the garage, whereby the system may provide side mirror protection and front bumper protection to the vehicle.

In one aspect, a user may install and use the system by following these steps:
providing and removably installing a laser device mount of the system in a vehicle, on a vehicle dashboard;
providing and removably mounting a laser pointer device of the system on the laser device mount;
determining a midline of a garage and marking the midline of the garage;
determining a midpoint of a targeted back garage wall along the midline and marking the midpoint with a stationary target;
powering on the laser pointer device and aligning the laser pointer device with the midpoint of the back garage wall while parking the vehicle to center the vehicle in the garage.

In one aspect, a method for using a laser pointer parking alignment system in accordance with the present invention may comprise one or more of the following steps and combinations thereof:
providing the laser pointer parking alignment system as described herein;
installing a laser pointer apparatus of the system by installing a laser device mount of the laser pointer apparatus in a vehicle, on a vehicle dashboard; and mounting a laser pointer device of the laser pointer apparatus on the laser device mount;
determining a midline or center line of a garage and a midpoint or center point of a rear wall of the garage;
marking the center line of the garage and the center point of the garage;
powering on the laser pointer device and aligning the pointer device with the midline of the garage and the midpoint of the garage; and
aligning and parking the vehicle.

In one aspect, marking the center line of the garage may comprise drawing a center line against a targeted back wall of the garage.

In one aspect, marking the center point of the garage may comprise placing a physical marker along the vertical center line of the targeted wall.

In another aspect, the midline of the garage may comprise a first central garage axis arranged in a front-to-back, longitudinal direction in the garage.

In another aspect, the midpoint of the targeted back garage wall may comprise a point where the first central garage axis and the targeted back garage wall intersect.

In another aspect, aligning the vehicle may comprise viewing a system digital display panel configured to display the distance to the stationary target and the rear garage wall as a user enters a garage with the laser beam aimed at the stationary target on the rear garage wall to view the distance to the stationary target.

In another aspect, aligning the vehicle may comprise viewing a system digital display panel configured to display the distance between the vehicle and the stationary target located at the rear garage wall, a distance from a right side view mirror of the vehicle to a right side wall of the garage and a distance from a left side view mirror of the vehicle to a left side wall of the garage, to view the distance to the stationary target, the distance from the right side view mirror of the vehicle to the right side garage wall, and the distance from the left side view mirror of the vehicle to the left side garage wall, whereby the system may be used to provide front bumper protection and side mirror protection to the vehicle.

In one aspect, the system provides an unprecedented, simple and effective solution for aligning and positioning a vehicle in any garage, and may be beneficially used to align and position a vehicle in a garage which has a narrow opening, or a small entry clearance. The system assists a user in avoiding vehicle damage such as scratches, dents, mirror breakage and the like. The system further improves safety of the user. The system may be beneficially used by all drivers, and may be particularly helpful for drivers who generally have difficulty getting a vehicle into a garage.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to laser pointer parking alignment system and method. The laser pointer parking alignment system comprises a laser pointer parking alignment apparatus, a fixation means for attaching the apparatus to a vehicle dashboard, a stationary target configured for removable securement to a surface such as a garage wall; and instructions for installation and use. The apparatus comprises a laser pointer device removably securable in a laser device mount which is removably mounted on a vehicle dashboard to assist in parking a vehicle. The stationary target has a surface capable of reflecting a laser beam emitted by the laser pointer device, for positioning the vehicle in a parking space such as a garage or the like. A user may install the system, and line the laser pointer device up with a midpoint of the middle portion of the surface (garage wall or the like); and align the vehicle with the midpoint. The system provides an unprecedented, simple, effective solution for aligning and positioning a vehicle in any garage or parking space.

Figure 1:
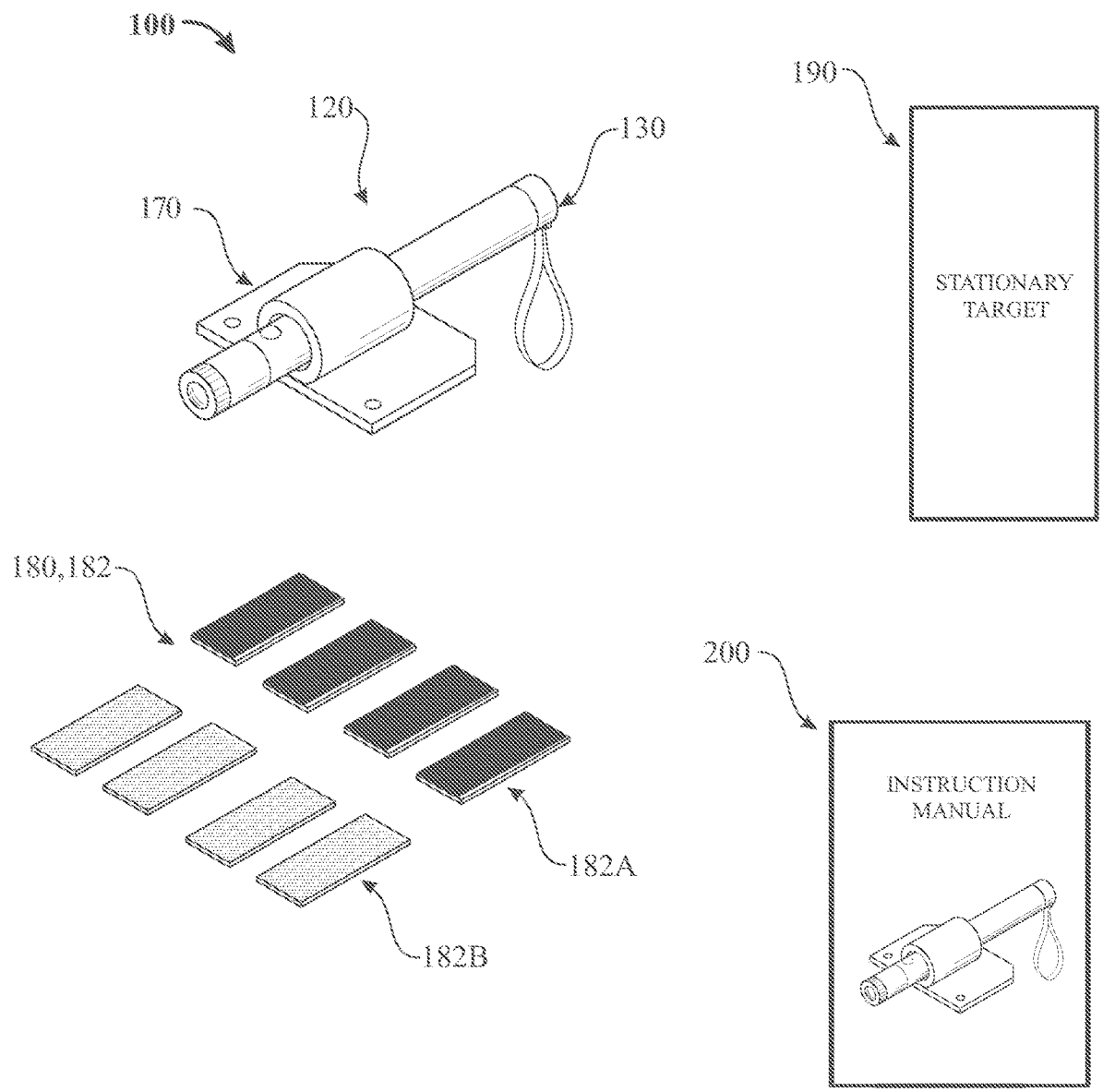
FIG. 1 presents a schematic view of a laser pointer parking alignment system in accordance with an illustrative embodiment of the present invention.
Figure 2:
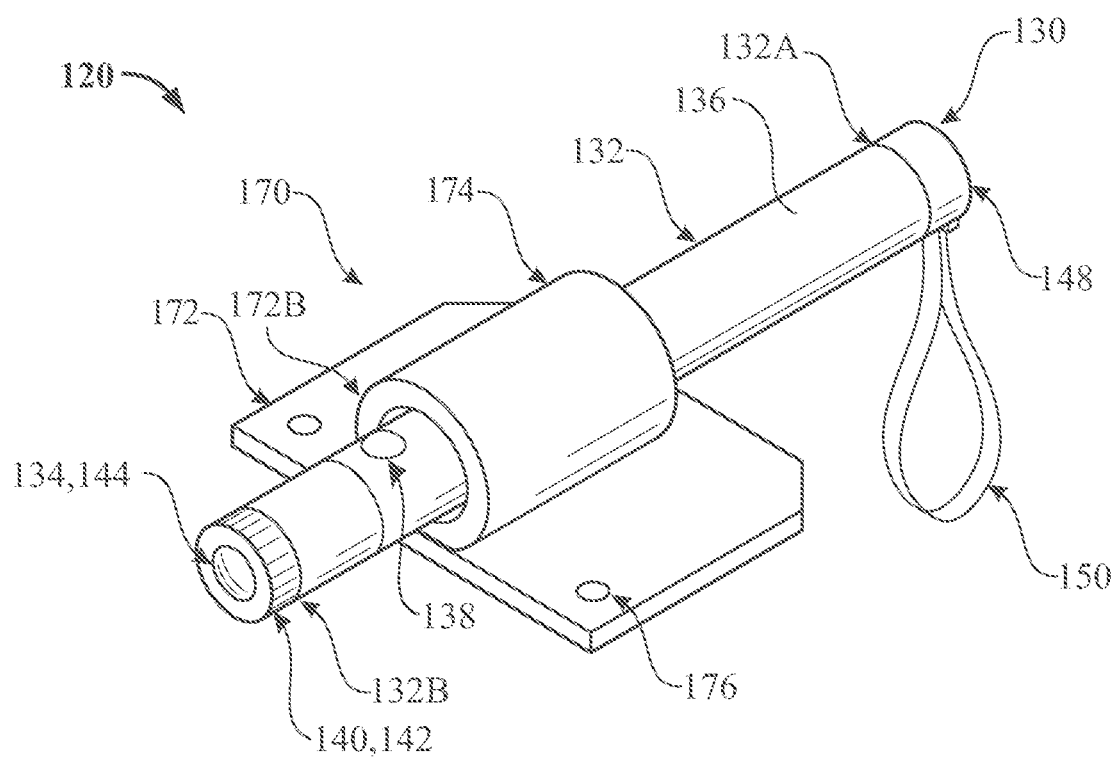
FIG. 2 presents a perspective view of a laser pointer parking alignment apparatus in accordance with an illustrative embodiment of the present invention.
Figure 3:
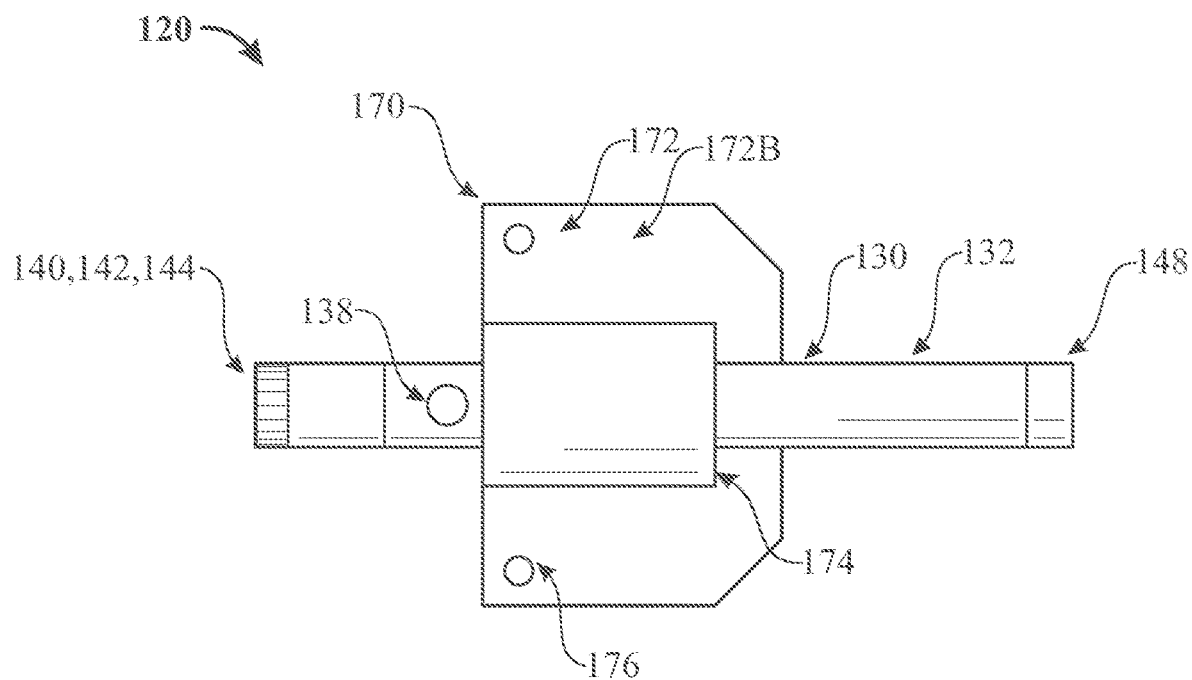
FIG. 3 presents a top view of the laser pointer parking alignment apparatus illustrated in FIG. 2.
Figure 4:
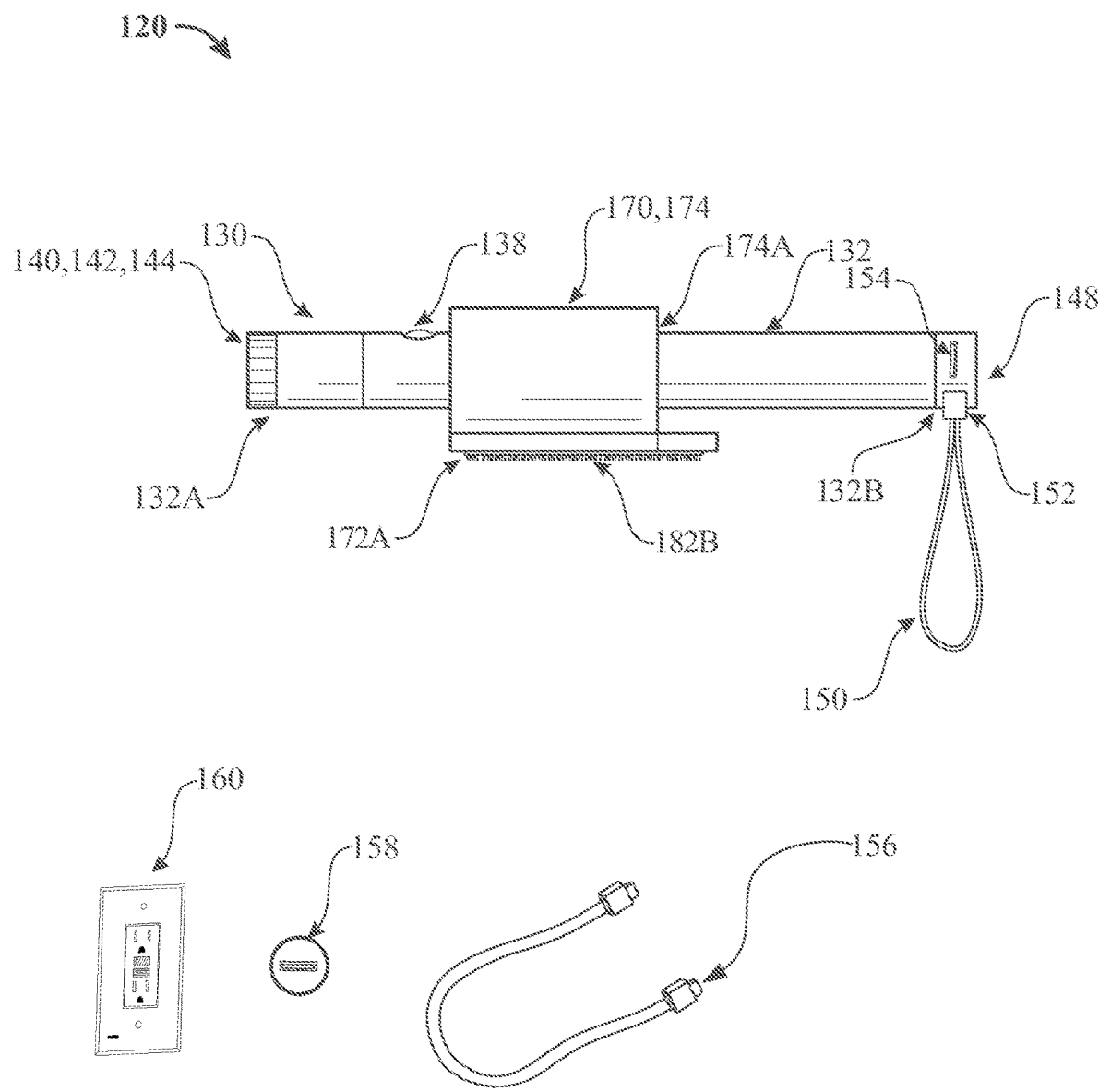
FIG. 4 presents a side view of the laser pointer parking alignment apparatus illustrated in FIG. 2.
Figure 5:
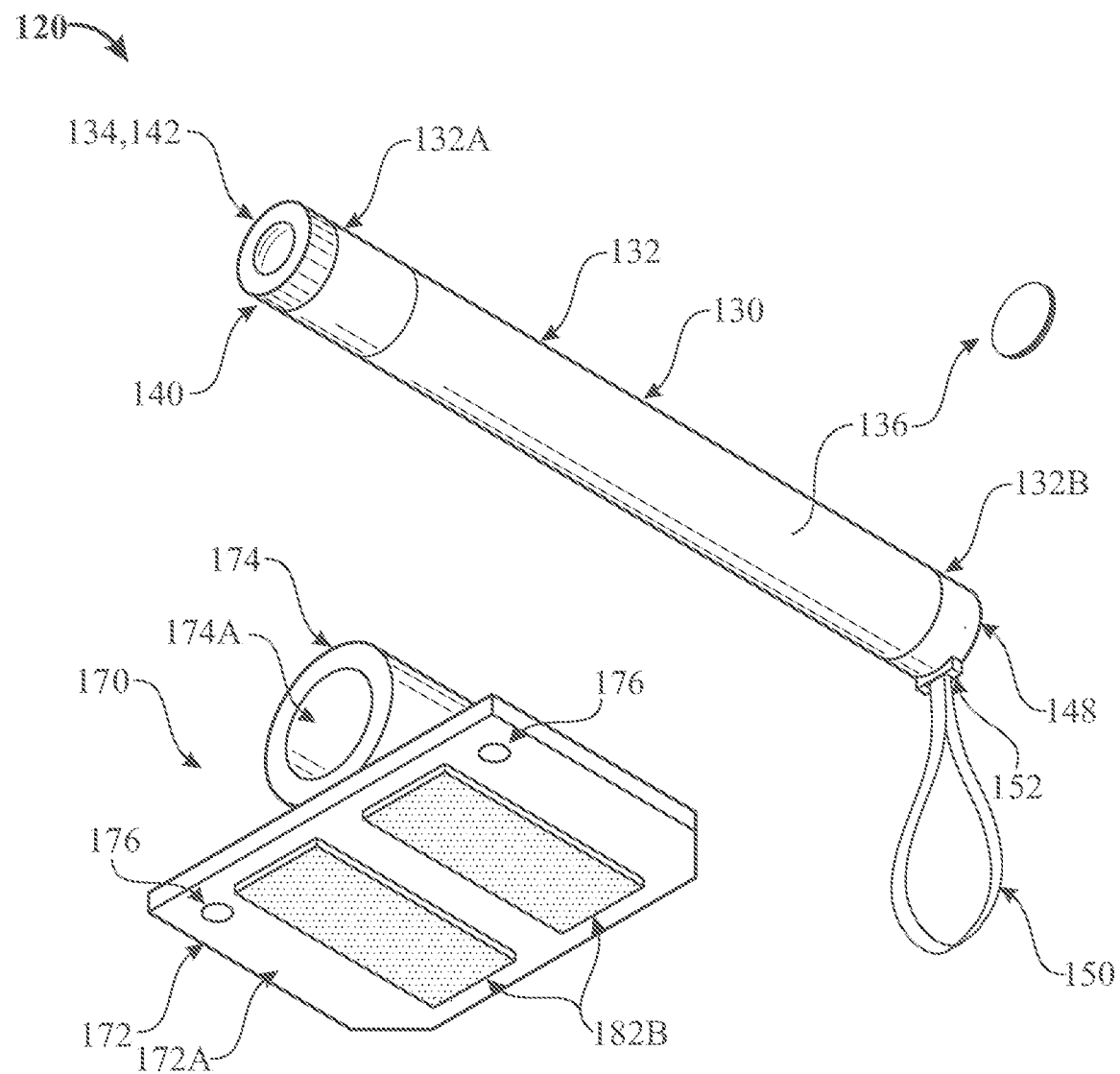
FIG. 5 presents an exploded left bottom perspective view of the laser pointer parking alignment apparatus illustrated in FIG. 2.
Figure 6:
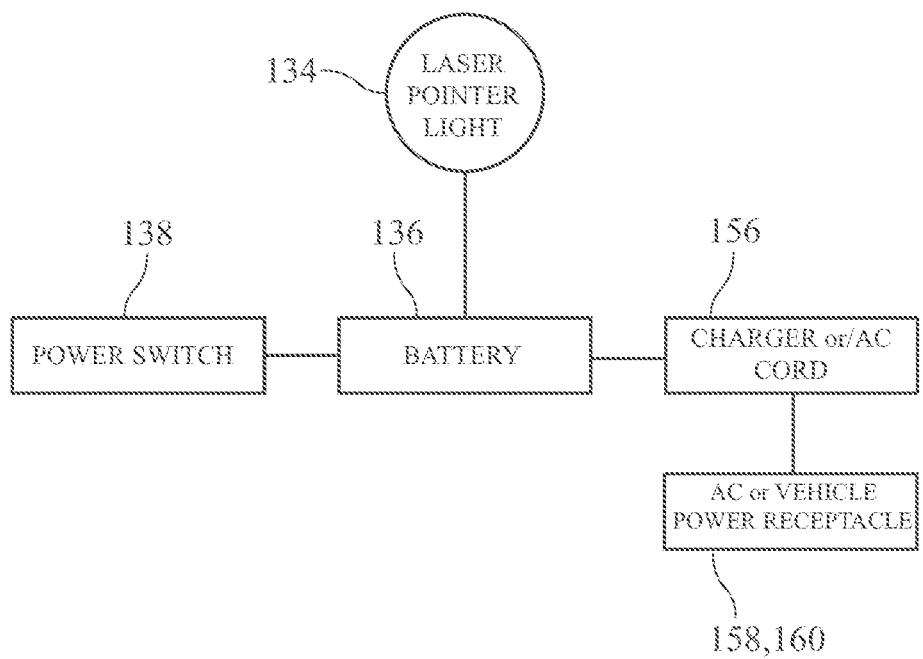
FIG. 6 presents a schematic view of a circuit suitable for the laser pointer device of the system or apparatus.
Figure 7:
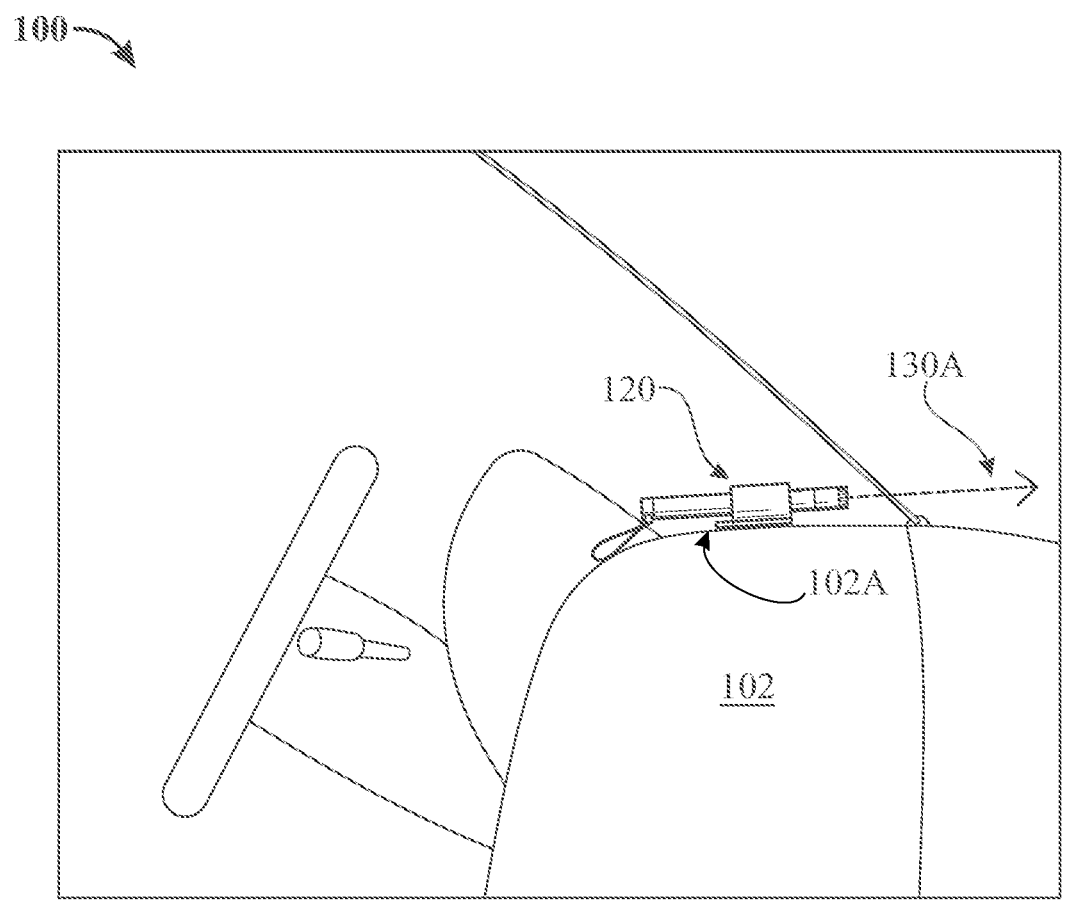
FIG. 7 presents an enlarged partial side view of a vehicle interior dashboard showing the laser pointer parking alignment apparatus mounted on the vehicle dashboard.
Figure 8:
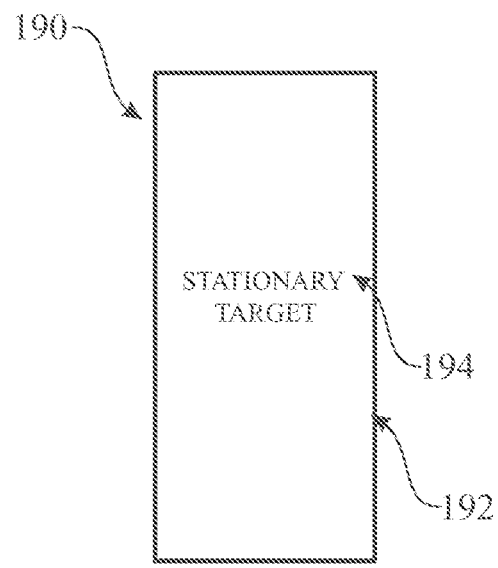
FIG. 8 presents a top view and a perspective view of the system instruction manual of the system as shown at FIG. 1.
Figure 8:
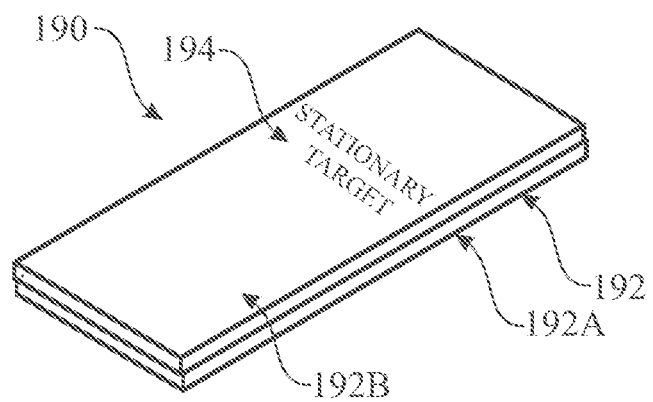

Referring to FIGS. 1-13, a laser pointer parking alignment system, hereinafter system 110, is illustrated in accordance with a first exemplary embodiment of the present invention. FIG. 1 shows the components of the system 110. The laser pointer parking alignment system comprises a laser pointer parking alignment apparatus 120, a fixation means 180 for attaching the apparatus to a vehicle dashboard 102 of a vehicle 100, a stationary target 190 configured for removable securement to a surface 106 such as a garage wall 106A of a garage 104A; and a system instruction manual 200 for installation, use and maintenance.

As shown at FIGS. 2-7, the laser pointer parking alignment apparatus 120 comprises a laser pointer device 130 removably securable in a laser device mount 170. The laser device mount 170 is removably mounted on a vehicle dashboard 102 (best seen at the enlarged partial side view of the interior of the vehicle 100 and the dashboard 102 shown at FIGS. 7 and 9-11) to assist in parking a vehicle 100. The laser device mount 170 is configured for removable securement to a vehicle dashboard surface 102A, and is configured to securely removably receive the laser pointer device 130 on an upper surface 170B thereof. The laser pointer device 130 is capable of emitting a laser light beam 130A.

The system 110 and its components may be made of any suitable materials, and fabricated by any suitable fabrication process.

The laser pointer device 130 may be any suitable commercially available laser pointer device. The laser pointer device 130 may be AC and/or DC powered. The laser pointer device 130 may have any suitable shape. In some embodiments, the laser pointer device 130 may comprise a cylindrical or tubular housing 132 with a first end 132A and a second end 132B. The laser pointer device may have a laser light 134 held in the housing, operably connected to a battery power source 136 also held in the housing 132. A power switch or button 138 may be located at any suitable location on the laser pointer device 130. In some embodiments, the power switch or button 138 is located on the housing 132 proximal to the first end 132A. The first end 132A may be provided with a first end cap 140 comprising a lens cap 142 configured to hold a laser lens 144 through which the laser light beam 130A is conveyed from the laser pointer device 130. The second end 132B may be provided with a removable second end cap 148 having a cord loop 150 and a cord 152 configured to extend therethrough. The battery power source 136 may comprise a removable and/or rechargeable battery 136A. The second end cap 148 may further include a charging receptacle 154 operably connected to the battery 136A for recharging. A recharging or power cord 156 may be attached for powering or recharging. The recharging or power cord 156 may be attached to a vehicle power receptacle 158, or to an AC power supply 160 for recharging. The lens cap 142 and the second end cap 148 may be removably secured to the housing 132 by a threaded connection or a snap fit. In some embodiments, the housing 132 may have a uniform outer diameter, and may have a first outer diameter at the first end that is equal to a second outer diameter at the second end. In other embodiments, the housing may be tapered and may have a first outer diameter at the first end which is greater than a second outer diameter at the second end. In other embodiments, the housing may be tapered and may have a first outer diameter at the first end which is less than the second outer diameter at the second end.

The laser device mount may comprise a base plate 172 and a laser device holder 174 held on the base plate 172. The base plate 172 comprises a first bottom surface 172A and a second top surface 172B. The base plate 172 may be any suitable shape that permits the base plate 172 to be removably mounted to a vehicle dash board 102 by affixing the first bottom surface 172A of the base plate 172 to the surface 102A of the vehicle dash board 102.

The laser device holder 174 is located on the second top surface 172B of the base plate 172. The laser device holder 174 may have any suitable shape. For example without limitation, the laser device holder 174 may comprise a collet, a chuck, a cylindrical tube or a tapered tube configured to receive and securely hold the laser pointer device housing. The laser pointer device housing 132 is configured to be securely held in an interior channel 174A of the laser device holder 174. The laser device holder 174 may have a uniform inner diameter or a tapered inner diameter. In some embodiments, the laser device holder interior channel 174A may have a first inner diameter at a first end that is equal to a second inner diameter at a second end. In other embodiments, the laser device holder interior channel 174A may be tapered and may have a first inner diameter at the first end which is greater than a second inner diameter at the second end. In other embodiments, the laser device holder interior channel 174A may be tapered and may have a first inner diameter at the first end which is less than the second inner diameter at the second end.

The laser device mount 170 and its components may be made of any suitable materials, and fabricated by any suitable fabrication process. In one aspect, the laser device mount 170 may be a single solid structure manufactured out of plastic, rubber, or foam. The mount base plate 172 and the laser device holder 174, whether integral or separate components, may be manufactured using 3D printing, injection modeling, or some other manufacturing process. The laser device base plate 172 and the laser device holder 174 may be a single component cast or machined of metal, alloys or the like.

The laser device holder 174 may be integrally molded with the mount base 172, or may be machined or cut into the device mount 170. In some embodiments, the laser device holder 174 may be mechanically secured to the mount base plate 172, or secured thereto mechanically, such as, for example without limitation, by screws. The components of the laser device mount 170 may be made of any suitable material, including but not limited to plastics, metals, alloys and blends.

The system 110 further comprises a fixation means/device 180 configured for removable securement of the laser device mount to the vehicle dash board. In one aspect, the fixation means/device may comprise a hook and loop fastening assembly 182 or the like, a nonlimiting example of which is a Velcro® brand hook and loop assembly. A first fixation device portion 182A may be secured to an upper surface 102A of the vehicle dash board 102, and a second fixation device portion 182B may be secured to the first bottom surface 172A of the laser device mount base plate 172. The base plate 172 may include screw holes 176 so that the mount 170 may be permanently secured to a vehicle dashboard 102 by screws.

The system 110 also comprises a stationary target 190 configured for removable securement to a surface of the parking structure. The stationary target may be removably secured to a surface of a structure such as a garage wall 106A, or other suitable structure including but not limited to a garage shelf or the like. The stationary target 190 is configured to be removably secured to the surface of the parking structure by a hook and loop fastening assembly 182 as described hereinabove (the system 110 may include multiple hook and loop fastening assemblies 182 as shown at FIG. 1). The stationary target 190 may also be secured to the surface of a parking structure by a suitable adhesive, such as conventional tape, double stick tape, or the like. The stationary target 190 is configured to reflect a laser light beam 130A emitted by the laser pointer device 130, for use in positioning the vehicle 100. The stationary target 190 may comprise a target main body 192 having a target bottom surface 192A and a target top surface 192B. The target 190 comprises an upper reflective surface 194 able to reflect the laser light beam 130A emitted by the laser pointer device 130 for positioning the vehicle 100. The upper reflective surface 194 may be laminated or adhesively affixed to at least a portion of the target main body 192. In some embodiments, the upper reflective surface 194 may cover a portion of the target main body 192. In other embodiments, the upper reflective surface 194 may comprise the target top surface 192B which covers the entire target main body 192. In some embodiments, the stationary target 190 may comprise a marker or a strip of material which may be mounted or adhered to the wall surface, or any suitable surface such as, for example without limitation, a shelving surface.

The system further comprises an instruction manual 200 which provides instructions for installation, use and maintenance of the system components.

Figure 9:
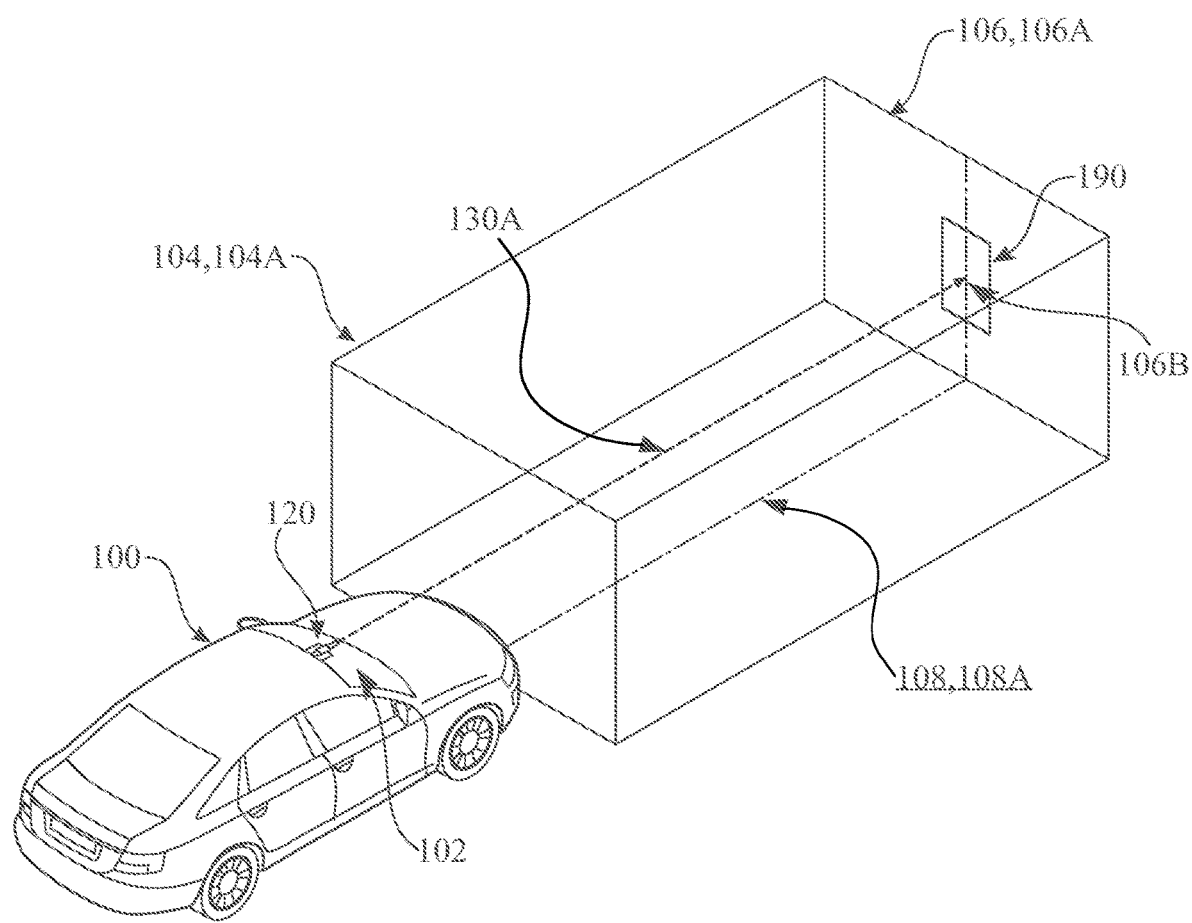
FIG. 9 presents a perspective view of a vehicle with the laser pointer parking alignment apparatus mounted on the vehicle dashboard, approaching a garage enclosure with the apparatus in use.
Figure 10:
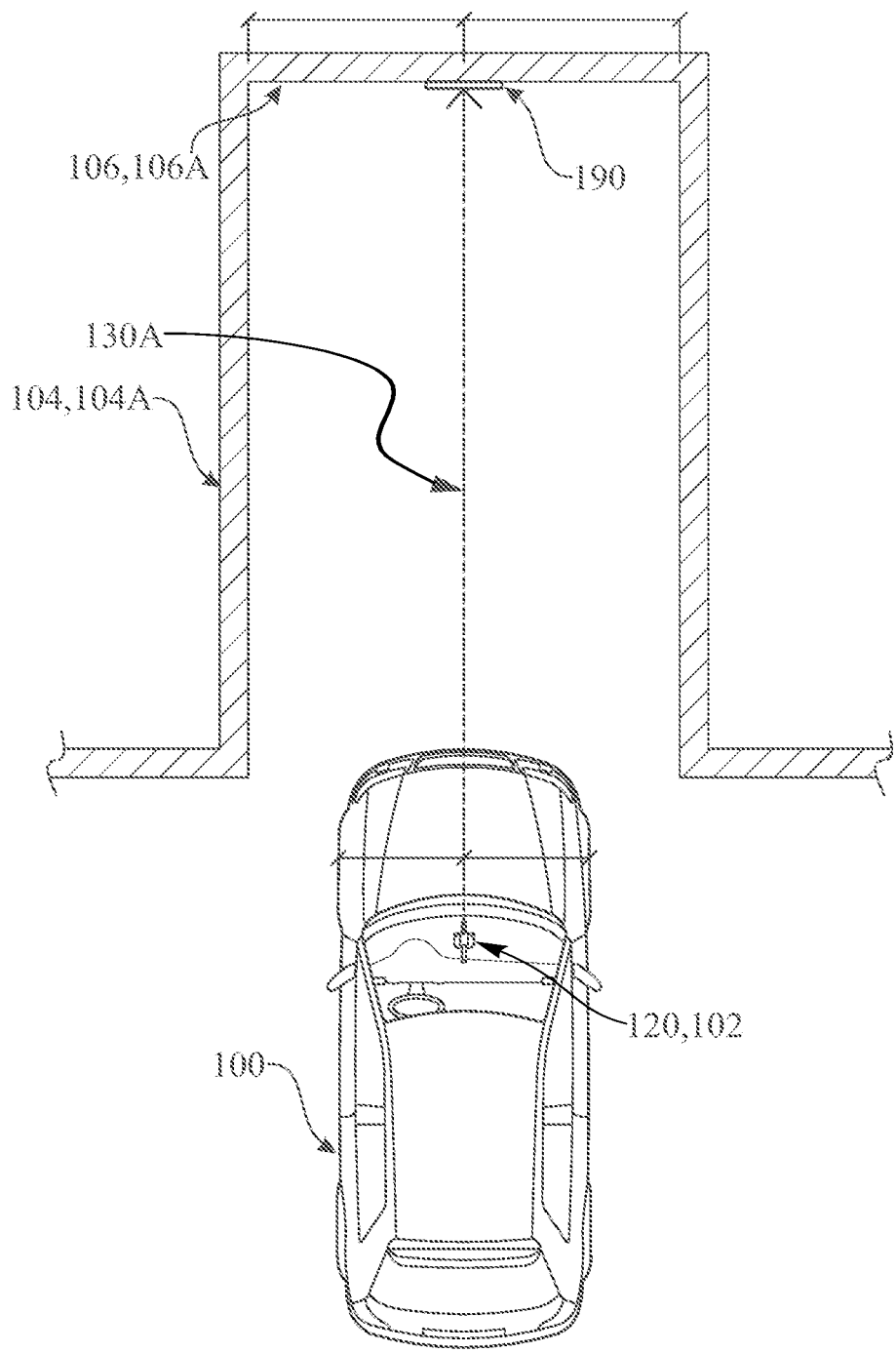
FIG. 10 presents a top view of a vehicle with the laser pointer parking alignment apparatus mounted on the dashboard of the vehicle approaching a garage space shown in cross section.
Figure 11:
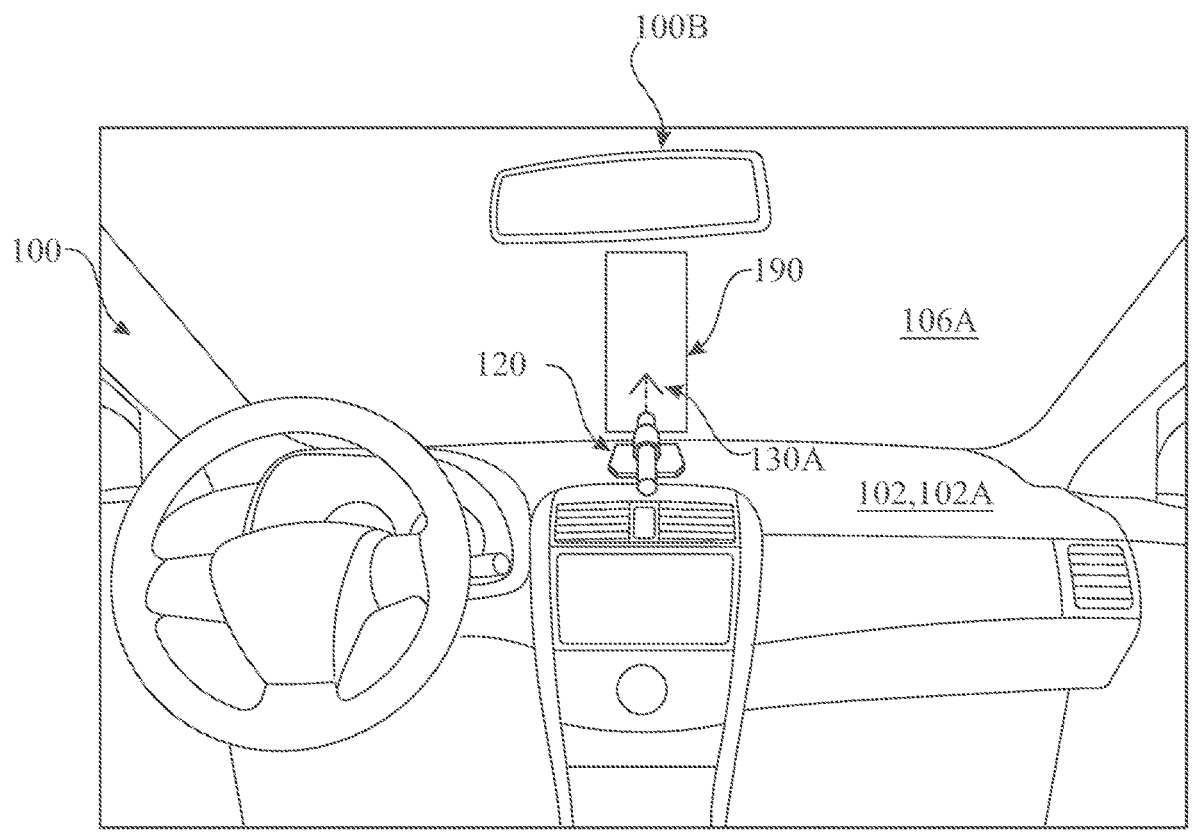
FIG. 11 presents an isometric view of the laser pointer parking alignment apparatus mounted in a vehicle, and showing the view of the wall target through the windshield from the vehicle parked in the garage after use of the apparatus to align the vehicle.

As seen at FIGS. 9 and 10, in use, the laser device mount 170 is positioned on the dashboard 102 perpendicular to a midpoint line of a windshield 100A of the vehicle 100 so the laser pointer device 130 is positioned perpendicular to the midpoint line which connects a vehicle rearview mirror 100B at the midpoint. The user may line the laser pointer device 130 and the laser beam 130A up with a midline 108 of a parking space 104, or a midline 108A of a garage 104A; and align the vehicle with a midpoint 106B of the wall 106 or garage wall 106A along the midline 108,108A. The system 110 provides an unprecedented, simple, effective solution for aligning and positioning a vehicle, such as for example without limitation, conventional passenger automobiles such as 2-door vehicle, 4-door vehicle, convertible, compact, sedan, station wagon, SUV, van, or the like in any garage or tight parking space.

Figure 12:
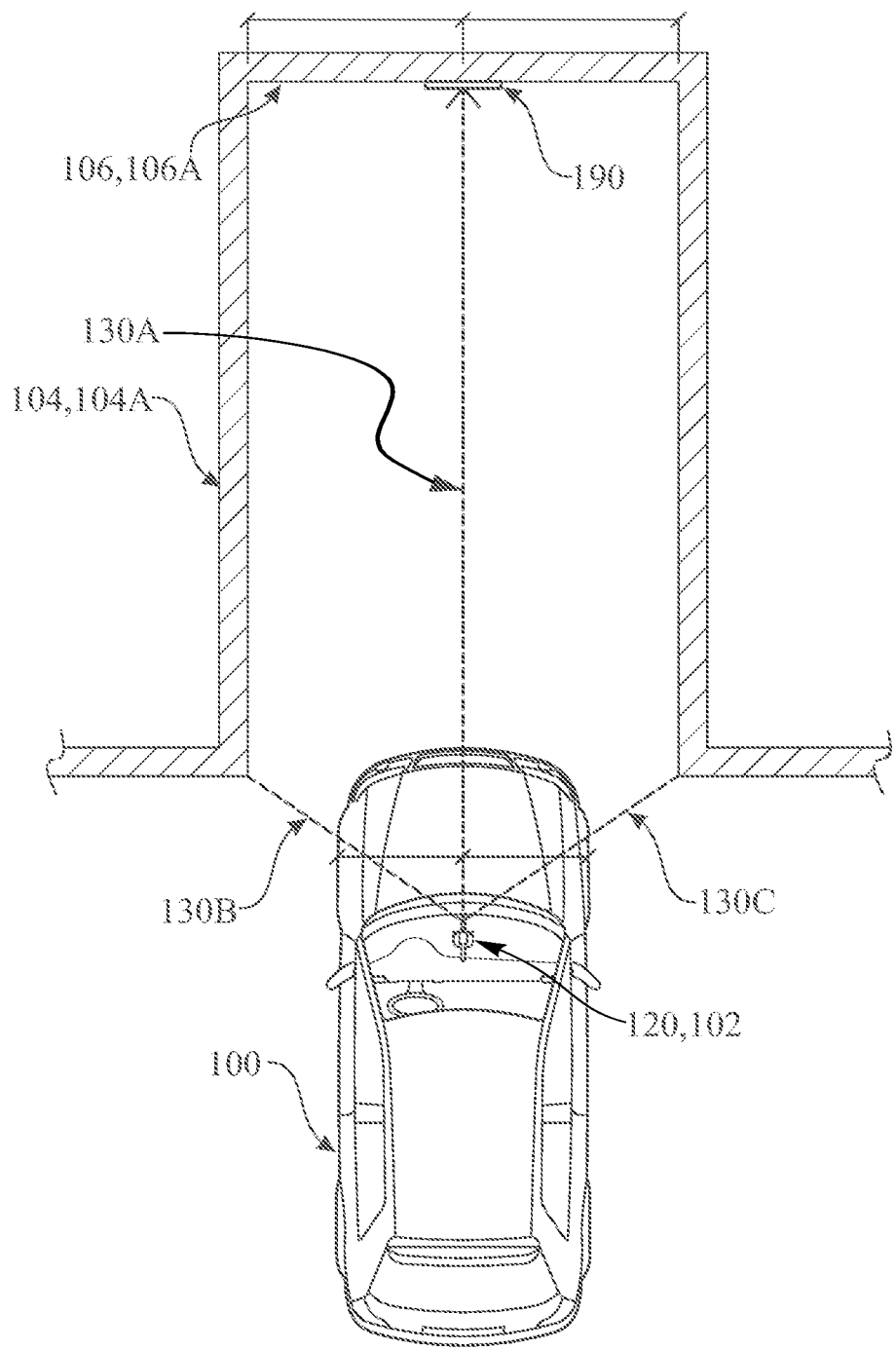
FIG. 12 presents a top view of a vehicle with the laser pointer parking alignment apparatus mounted on the dashboard of the vehicle approaching a garage space shown in cross section.
Figure 13:
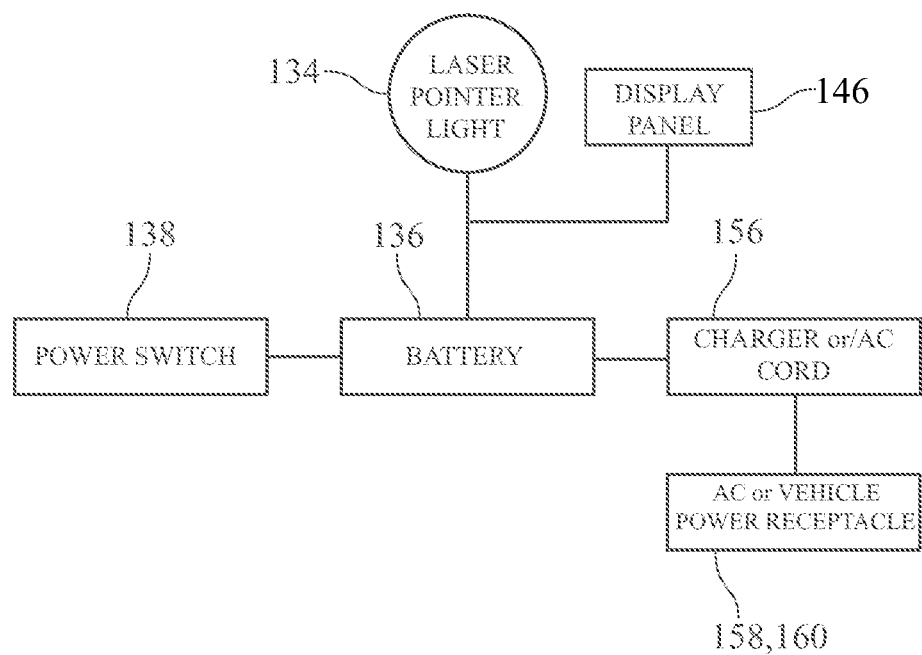
FIG. 13 presents a schematic view of a circuit suitable for the laser pointer device of the system or apparatus.
Figure 18:
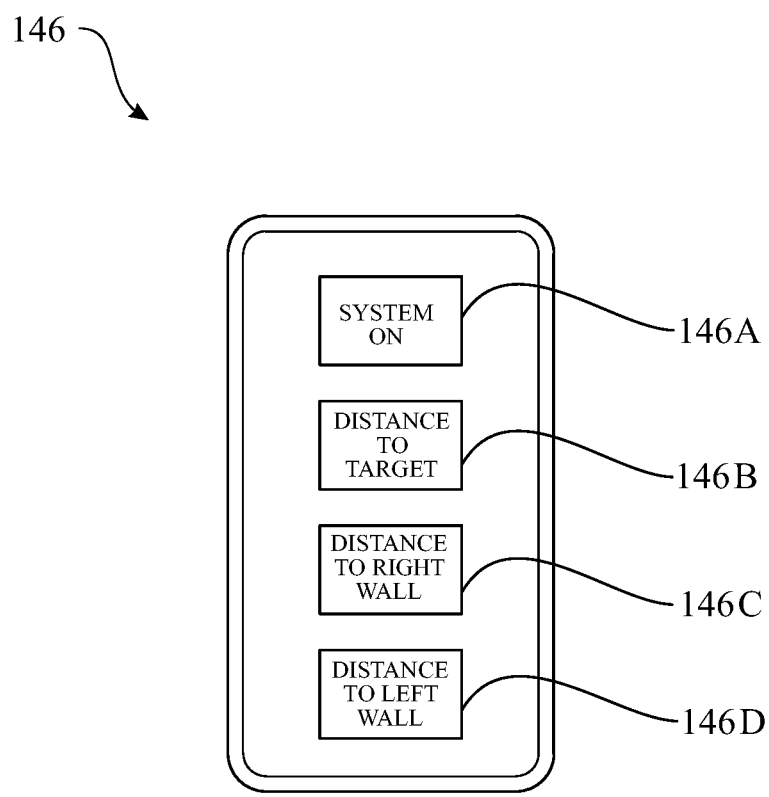
FIG. 18 presents a schematic view of a control panel of the laser pointer device of the system or apparatus.

Referring now to FIGS. 12-13, in some embodiments, in addition to lining the laser pointer device 130 and the laser beam 130A up with a midline 108 of a parking space 104, or a midline 108A of a garage 104A; and aligning the vehicle with a midpoint 106B of the wall 106 or garage wall 106A along the midline 108,108A, the user may also align the vehicle a predetermined distance from a right side view mirror of the vehicle to a right side wall of a garage (as represented by line 130B of FIG. 12), and a predetermined distance from a left side view mirror of the vehicle to a left side wall of the garage (as represented by line 130C of FIG. 12). To align the vehicle, the user may view a system digital display panel 146 (shown at FIGS. 13 and 18) configured to display a distance between the vehicle and the stationary target located at the rear garage wall, a distance from a right side view mirror of the vehicle to a right side wall of the garage, and a distance from a left side view mirror of the vehicle to a left side wall of the garage. The user may view the distance to the stationary target, the distance from the right side view mirror of the vehicle to the right side garage wall, and the distance from the left side view mirror of the vehicle to the left side garage wall, so the system may provide front bumper protection and side mirror protection to the vehicle. A nonlimiting example of a display panel 146 is shown at FIG. 18.

In a second implementation the present invention provides a method for using a laser pointer parking alignment system. Previous laser-guided garage parking devices focus on determining how close the vehicle is to the back wall. In one aspect, the laser-guided system of the present invention may be used to center a vehicle in a given parking space. Some two car garage spaces have a vertical structural member between them, leaving very little space to park a vehicle. The laser-guided system centers the vehicle in a given space. The center of a predetermined parking space is calculated (i.e., the space required for a vehicle to successfully enter the parking space). A vertical center line is drawn against the back wall of the garage. A marker (stationary target) is placed along the vertical center line of the targeted wall. A laser pointer apparatus is mounted on the dashboard of the vehicle. The laser pointer apparatus includes a laser pointer device configured to let a user know how close the center of the vehicle is to the center line marker (stationary target). This provides the user the ideal location to park a car in the parking space in a garage and guides the user in positioning the car in the parking space. The laser pointer device is positioned perpendicular to a line that connects the mirror at the midpoint. The stationary target of the system is configured to be mounted on an innermost garage interior wall distal to the garage opening and garage door. The stationary target may be positioned at a middle portion of the garage interior wall.

To use the system, a user may line the laser pointer device up with a midpoint of the middle portion of the garage wall; and align the vehicle with the midpoint.

A method for using a laser pointer parking alignment system in accordance with the present invention may comprise one or more of the following steps and combinations thereof:

providing the laser pointer parking alignment system as described herein;

installing a laser pointer apparatus of the system by installing a laser device mount of the laser pointer apparatus in a vehicle, on a vehicle dashboard; and mounting a laser pointer device of the laser pointer apparatus on the laser device mount;

determining a midline or center line of a garage and a midpoint or center point of a rear wall of the garage;

marking the center line of the garage and the center point of the garage;

powering on the laser pointer device and aligning the pointer device with the midline of the garage and the midpoint of the garage; and aligning and parking the vehicle.

The step of marking the center line of the garage may comprise drawing a center line against a targeted back wall of the garage.

The step of marking the center point of the garage may comprise placing a physical marker along the vertical center line of the targeted wall.

A user may install and use the system by following these steps:

removably installing a laser device mount of the system in a vehicle, on a vehicle dashboard;

removably mounting a laser pointer device of the system on the laser device mount;

determining a midline of a garage and marking the midline of the garage;

determining a midpoint of a targeted back garage wall along the midline and marking the midpoint;

powering on the laser pointer device; and aligning the laser pointer device with the midpoint of the back garage wall while parking the vehicle to center the vehicle in the garage.

The midline of the garage may comprise a first central garage axis arranged in a front-to-back, longitudinal direction in the garage.

The midpoint of the targeted back garage wall may comprise a point where the first central garage axis and the targeted back garage wall intersect.

Figure 14:
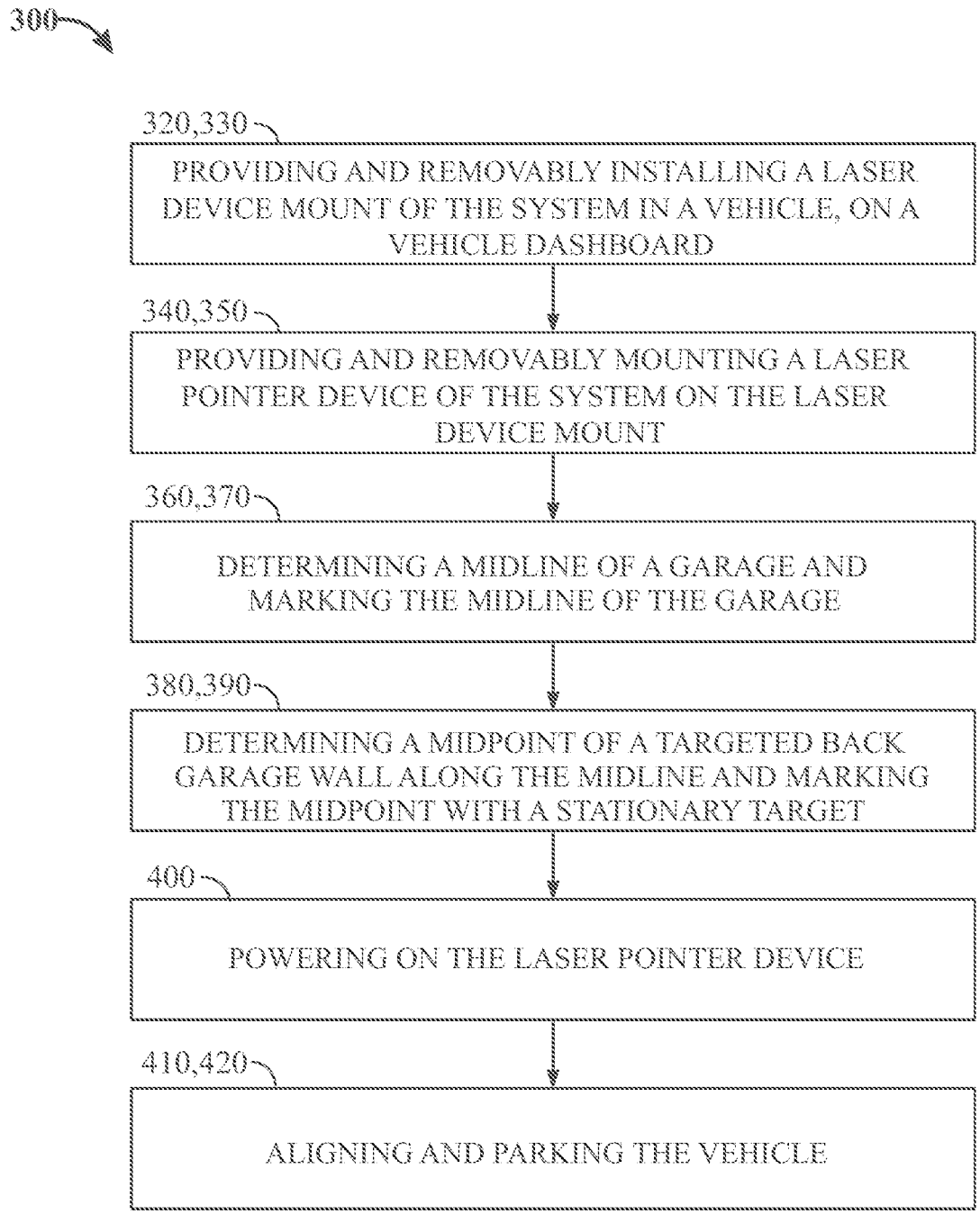
FIG. 14 presents a flow chart of a method for installation and use of the system in accordance with an embodiment the present invention.

Referring to FIG. 14, the present invention may provide a method 300 comprising the following steps.

(320,330): (320) providing and (330) removably installing a laser device mount of the system in a vehicle, on a vehicle dashboard;

(340,350): (340) providing and (350) removably mounting a laser pointer device of the system on the laser device mount;

(360,370): (360) determining a midline of a garage and (370) marking the midline of the garage;

(380,390): (380) determining a midpoint of a targeted back garage wall along the midline and (390) marking the midpoint with a stationary target;

(400) powering on the laser pointer device; and (410,420) (410) aligning the vehicle and (420) parking the vehicle by driving the vehicle into the garage space from the aligned position.

Figure 15:
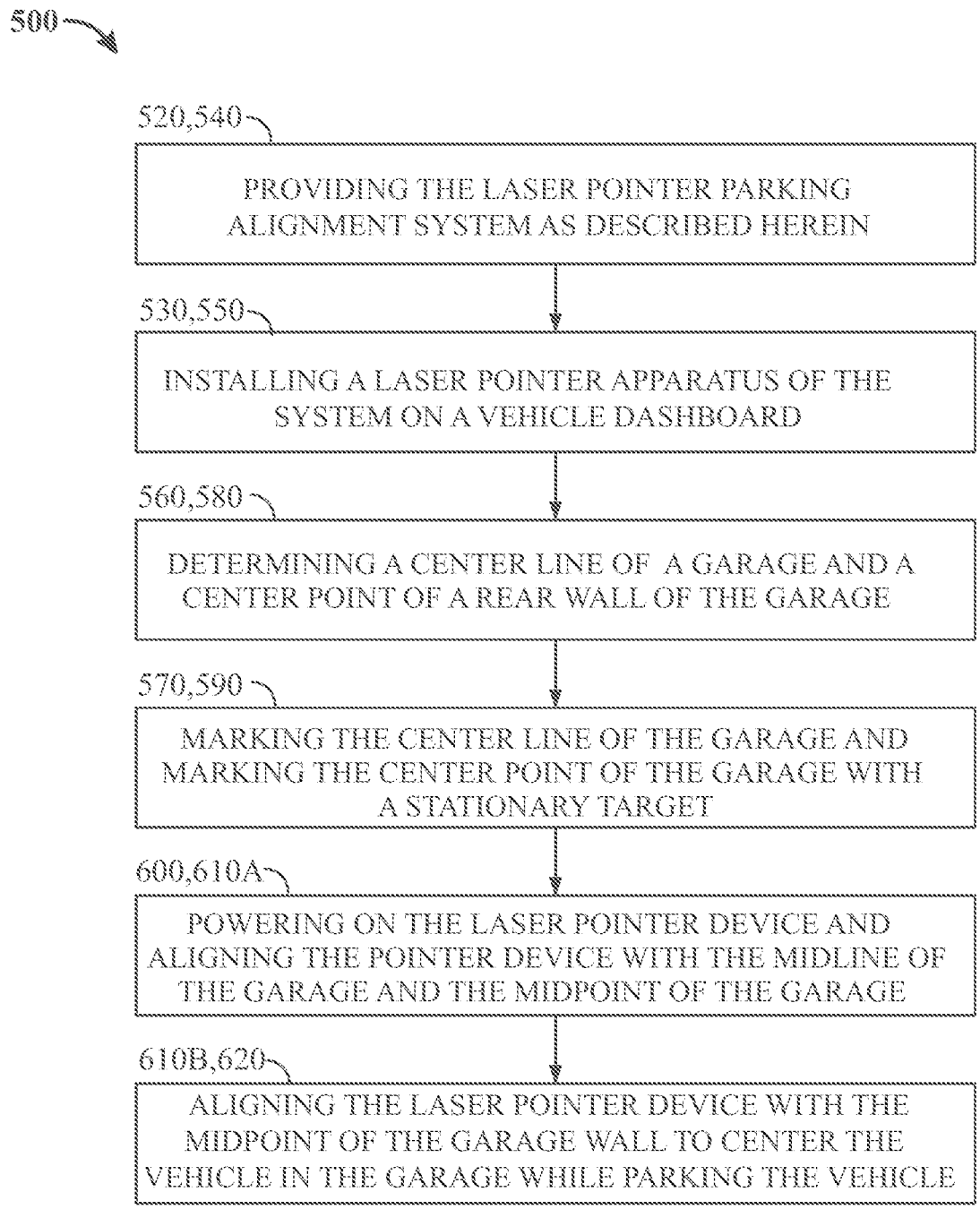
FIG. 15 presents a flow chart of a method for installation and use of the system in accordance with an embodiment of the present invention.

Referring to FIG. 15, the present invention may provide a method 500 comprising the following steps.

(520,540) providing the laser pointer parking alignment system as described herein;

(530,550) installing a laser pointer apparatus of the system on a vehicle dashboard;

(560,580) determining a center line of a garage and a center point of a rear wall of the garage;

(570,590) marking the center line of the garage and marking the center point of the garage with a stationary target;

(600,610A) (600) powering on the laser pointer device and (610A) aligning the pointer device with the midline of the garage and the midpoint of the garage; and (610B,620) aligning the laser pointer device with the midpoint of the garage wall to center the vehicle in the garage while parking the vehicle.

After the vehicle is parked, the apparatus may be removed from the vehicle for use in another vehicle.

Alternative embodiments are contemplated in which the laser pointer device is configured to be programmed for use in multiple parking locations by multiple vehicles and may include a database for storage of the multiple use program data.

Figure 16:
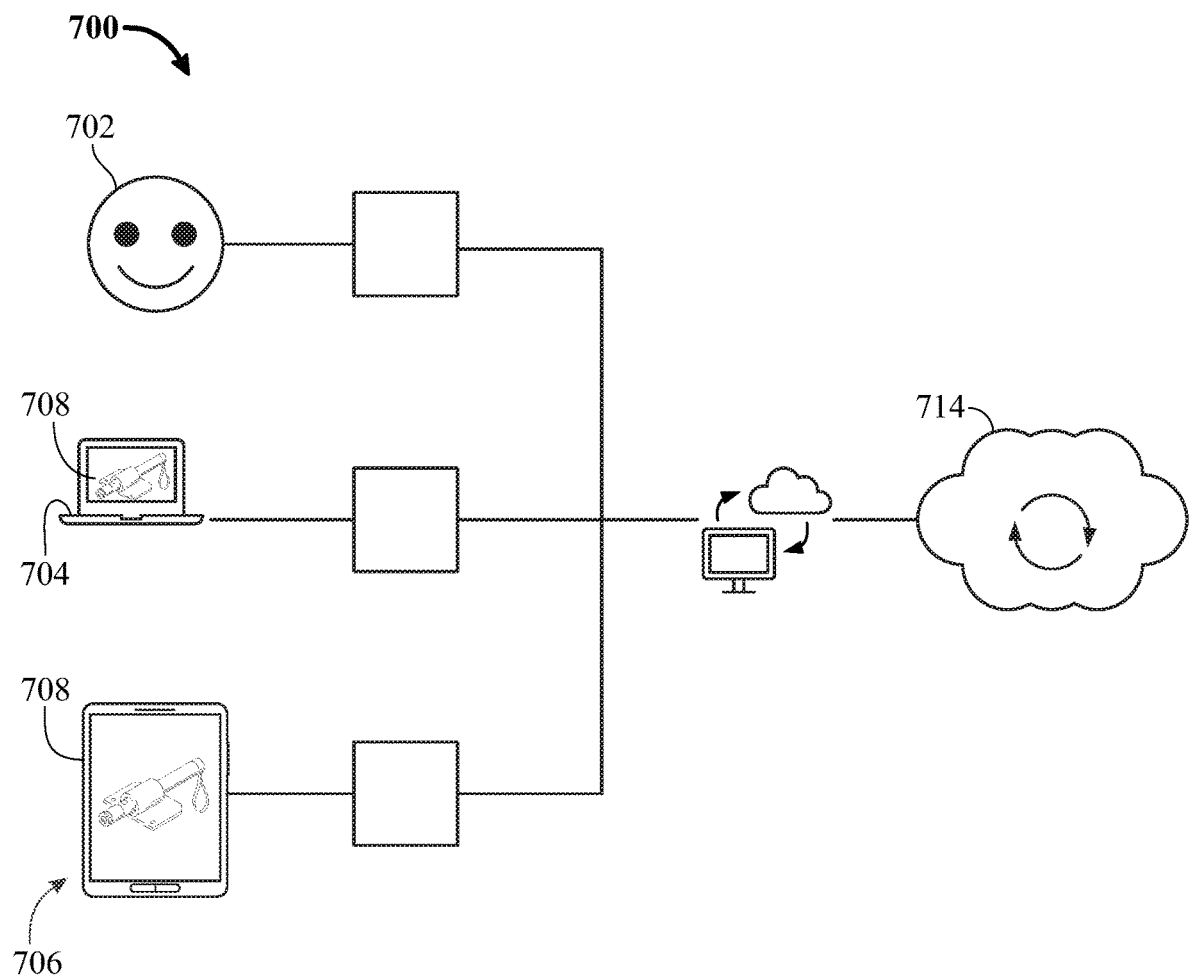
FIG. 16 presents a schematic view of a computing system which may be used to operate or control the system shown and described herein in accordance with an illustrative embodiment of the present invention.
Figure 19:
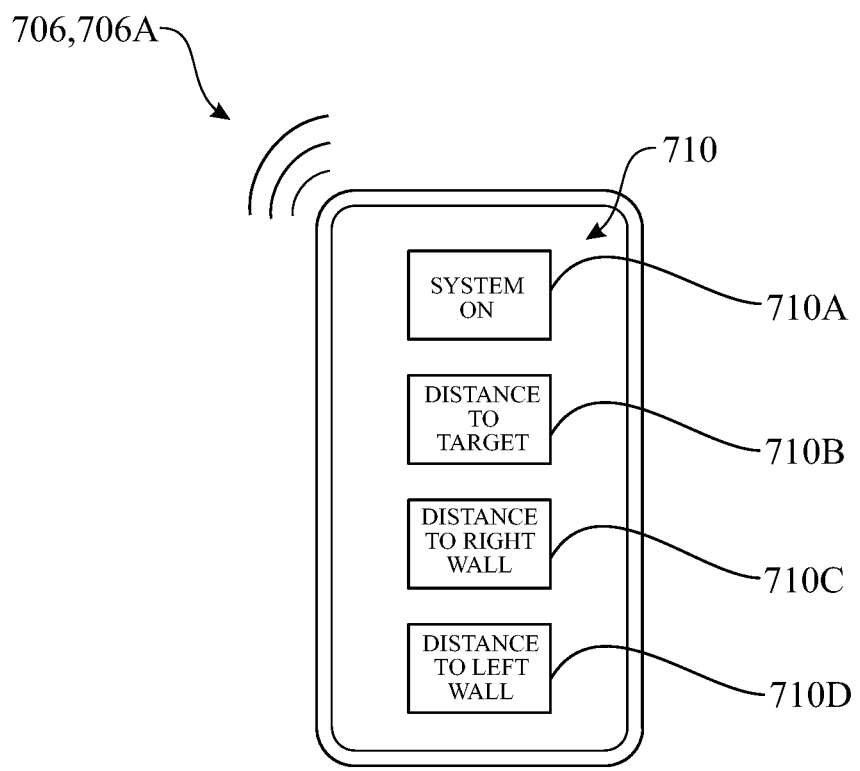
FIG. 19 presents a schematic view of a system device of the system or apparatus which has a system control panel.
Figure 20:
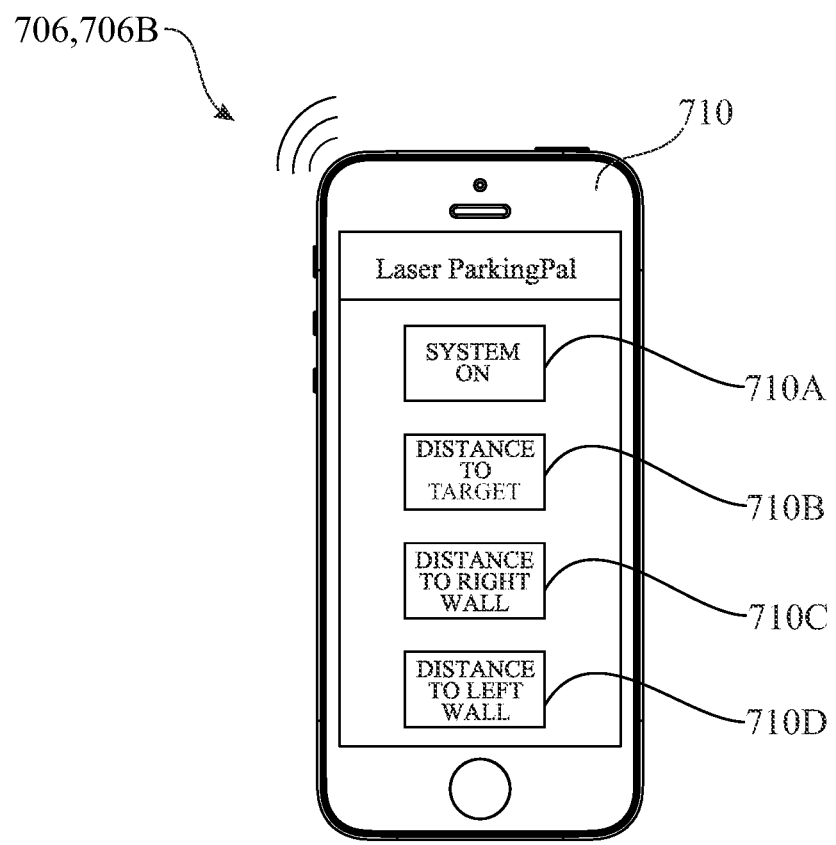
FIG. 20 presents a schematic view of a mobile device capable of use with the system for use of a system control panel.

Referring now to FIG. 16, a schematic diagram of an exemplary computing system 700 which may be used to operate or control the system of the present invention as shown and described herein. The system 700 may be used by at least one end-user 702. The computing system 700 may comprise a computing device 704 in which a system software program 708 is installed (the computing device 704 is shown as a desktop or a notebook computer. The system 700 may include a mobile computing system 706 (in which the system software program 708 is installed). In some embodiments, the system may further comprise an administrative system 714 to which the computing devices 704,706 may wirelessly (or by wired connection) communicate through use of the system software program 708. The computing device 704,706 may comprise any suitable device, nonlimiting examples of which may be an end-user's mobile phone or tablet. As shown at FIGS. 19-20, the computing device 706 may comprise a wireless system mobile device 706A (shown at FIG. 19) or a user's mobile phone 706B (shown at FIG. 20) with system software downloaded thereon. The system mobile device 706 may include having a control panel, touch screen or graphical user interface 710 configured to provide a system power switch or button 710A, a distance to target selector 710B, a distance to right wall selector 710C and a distance to left wall selector 710D. The wireless system mobile device 706 may include or incorporate a display panel 146 as shown and described herein.

In some embodiments the method or methods described herein may be executed or carried out by a computing system including a tangible computer-readable storage medium, also described herein as a storage machine, that holds machine-readable instructions executable by a logic machine (i.e. a processor or programmable control device) to provide, implement, perform, and/or enact the methods, processes and/or tasks described herein. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described herein. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described herein to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Figure 17:
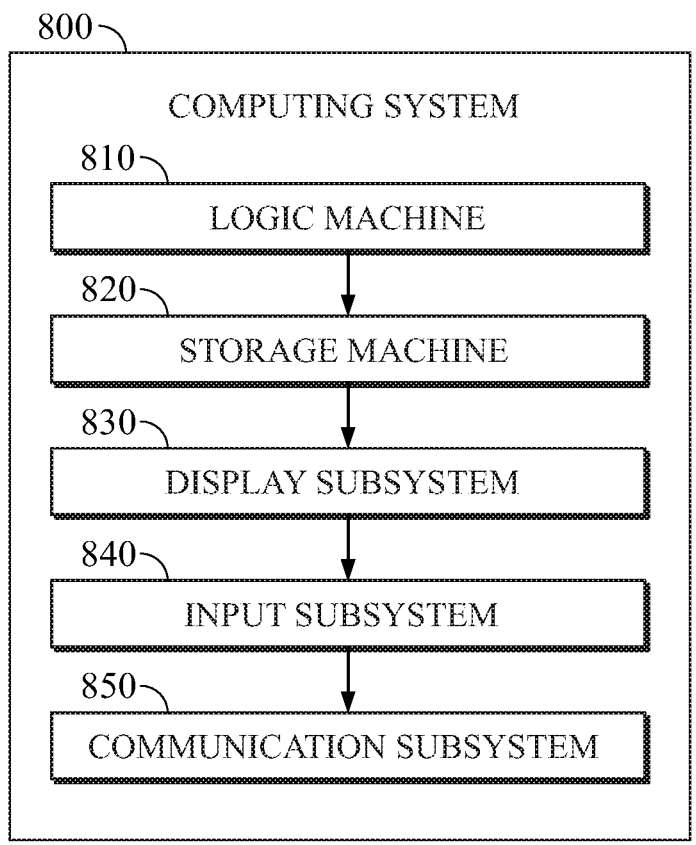
FIG. 17 presents a schematic view of a computing system in accordance with an illustrative embodiment of the present invention.

Referring now to FIG. 17, the illustration of FIG. 17 schematically presents a computing system that may represent a computing system of a of a system, apparatus or device in accordance with an embodiment of the present invention. In some embodiments the methods described herein may be executed on a computing system such as the computing system 800 of FIG. 17. For example, the storage machine 820 may hold instructions executable by the logic machine 810 to provide the method to users. Display subsystem 830 may display the various elements of the method to users. For example, the display subsystem 830, the storage machine 820, and the logic machine 810 may be integrated such that the method may be executed while being displayed on a display screen. The input subsystem 840 may receive user input from users to indicate the various choices or user inputs described herein. The described method may be executed, provided, or implemented to a user on one or more computing devices via a computer-program product such as via an application programming interface (API). FIG. 17 schematically shows a non-limiting exemplary embodiment of a computing system 800 that can enact the method described herein. Computing system 800 may be any appropriate computing device such as a personal computer, tablet computing device, gaming device or console, mobile computing device, etc. Computing system 800 includes a logic machine 810 and a storage machine 820. Computing system 800 may include a display subsystem 830, input subsystem 840, and communication subsystem 850. Logic machine 810 may execute machine-readable instructions via one or more physical devices. For example, the logic machine 810 may be configured to execute instructions to perform tasks for a computer program. The logic machine 810 may include one or more processors to execute machine-readable instructions. The storage machine 820 includes one or more physical devices configured to hold or store instructions executable by the logic machine 810 to implement the method. When such methods and processes are implemented, the state of storage machine 820 may be changed to hold different data. For example, the storage machine 820 may include memory devices such as various hard disk drives or CD or DVD devices. The display subsystem 830 may visually present data stored on the storage machine 820. For example, the display subsystem 830 may visually present data to form a graphical user interface (GUI). The input subsystem 840 may be configured to connect and receive input from devices such as a mouse, keyboard, or gaming controller. The communication subsystem 850 may be configured to enable the computing system 800 to communicate with other computing devices. The communication subsystem 850 may include wired and/or wireless communication devices to facilitate networked communication.

Figure 21:
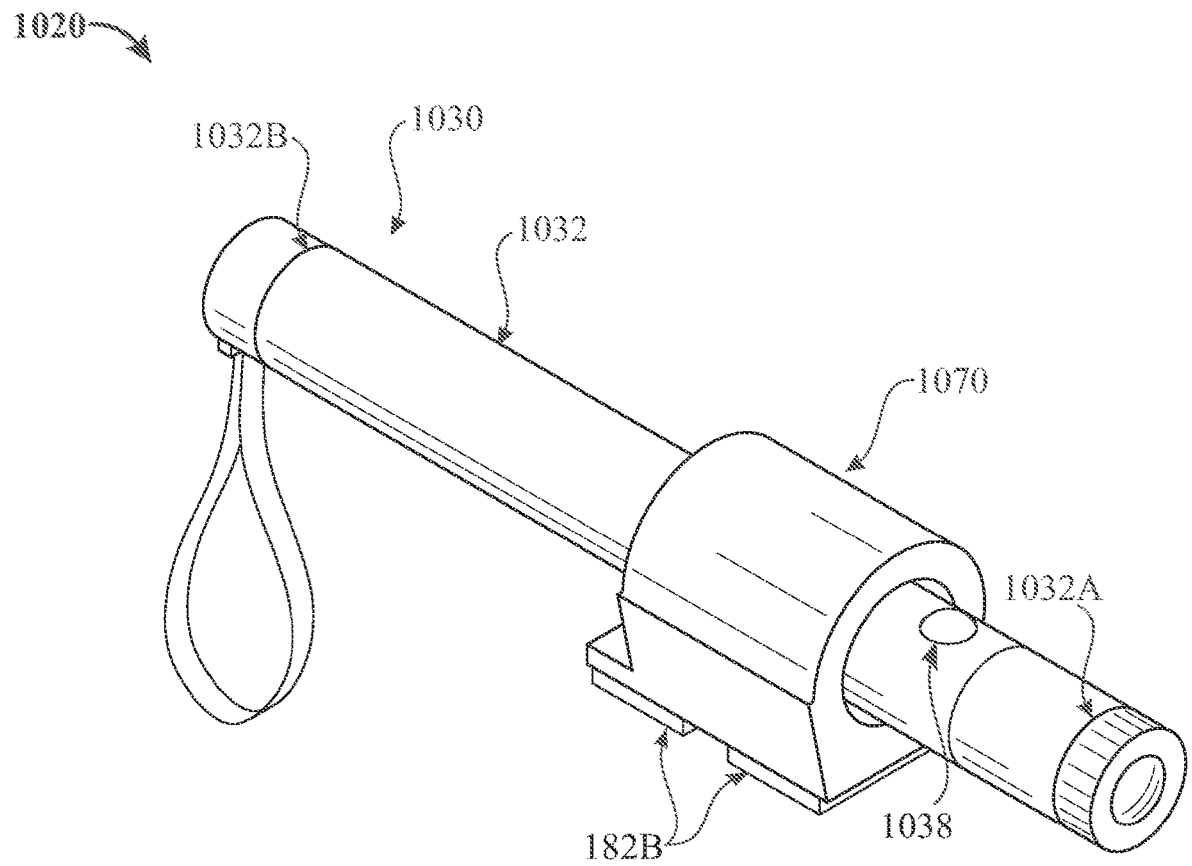
FIG. 21 presents a front perspective view of a laser pointer parking alignment apparatus in accordance with an illustrative embodiment of the present invention.

Referring next to FIG. 21, a laser pointer parking alignment apparatus 1020 which may be used or provided with a system 110 described herein, is shown in accordance with a third illustrative embodiment of the invention. Reference numerals which correspond to like elements of the apparatus 120 heretofore described with respect to FIGS. 1-20 are designated by the same reference numerals in the 1000-1099 series in FIG. 21 and in FIGS. 22-25 (which show further views of the laser device mount 1070 of the apparatus 1020).

As shown at FIG. 21, a laser pointer parking alignment apparatus 1020 which may be used with a system 110 described herein, comprises a laser pointer device 1030 removably securable in a laser device mount 1070. The laser device mount 1070 may be removably mounted on a vehicle dashboard 102 as shown and described herein. The laser device mount 1070 is configured for removable securement to a vehicle dashboard surface, and is configured to securely removably receive the laser pointer device 1030. The laser pointer device 1030 is capable of emitting a laser light beam.

The laser pointer device 1030 may be made of any suitable components by any suitable fabrication process. The laser pointer device 1030 may be any suitable commercially available laser pointer device, and may be as described herein. The laser pointer device 1030 may be AC and/or DC powered. The laser pointer device 1030 may have any suitable shape. In some embodiments, the laser pointer device 1030 may comprise a cylindrical or tubular housing 1032 with a first end 1032A and a second end 1032B with a power switch or button 1038. The laser pointer device 1030 is configured to be securely removably held in the laser device mount 1070. Further details regarding the laser pointer device 1030 are provided in the description of laser pointer device hereinabove with reference to FIGS. 1-7.

Referring to FIGS. 22-25, various views of the laser device mount 1070 are shown. The laser device mount 1070 may comprise a base plate 1072 and a laser device holder 1074 which may be connected or integrally formed. The base plate 1072 comprises a first bottom surface 1072A and a second top surface 1072B. The base plate 1072 may be any suitable shape that permits the base plate 1072 to be removably mounted to a vehicle dash board by affixing the first bottom surface 1072A of the base plate 1072 to the surface of the vehicle dash board.

The laser device holder 1074 is located on the second top surface 1072B of the base plate 1072. The laser device holder 1074 may have any suitable shape. For example without limitation, the laser device holder 1074 may comprise a collet, a chuck, a cylindrical tube or a tapered tube configured to receive and securely hold the laser pointer device housing 1032. The laser pointer device housing 1032 is configured to be securely held in an interior channel 1074A of the laser device holder 1074 (as shown at FIG. 21). The laser device holder 1074 may have a uniform inner diameter or a tapered inner diameter. In some embodiments, the laser device holder interior channel 1074A may have a first inner diameter at a first end that is equal to a second inner diameter at a second end. In other embodiments, the laser device holder interior channel 1074A may be tapered and may have a first inner diameter at the first end which is greater than a second inner diameter at the second end. In other embodiments, the laser device holder interior channel 1074A may be tapered and may have a first inner diameter at the first end which is less than the second inner diameter at the second end.

Figure 22:
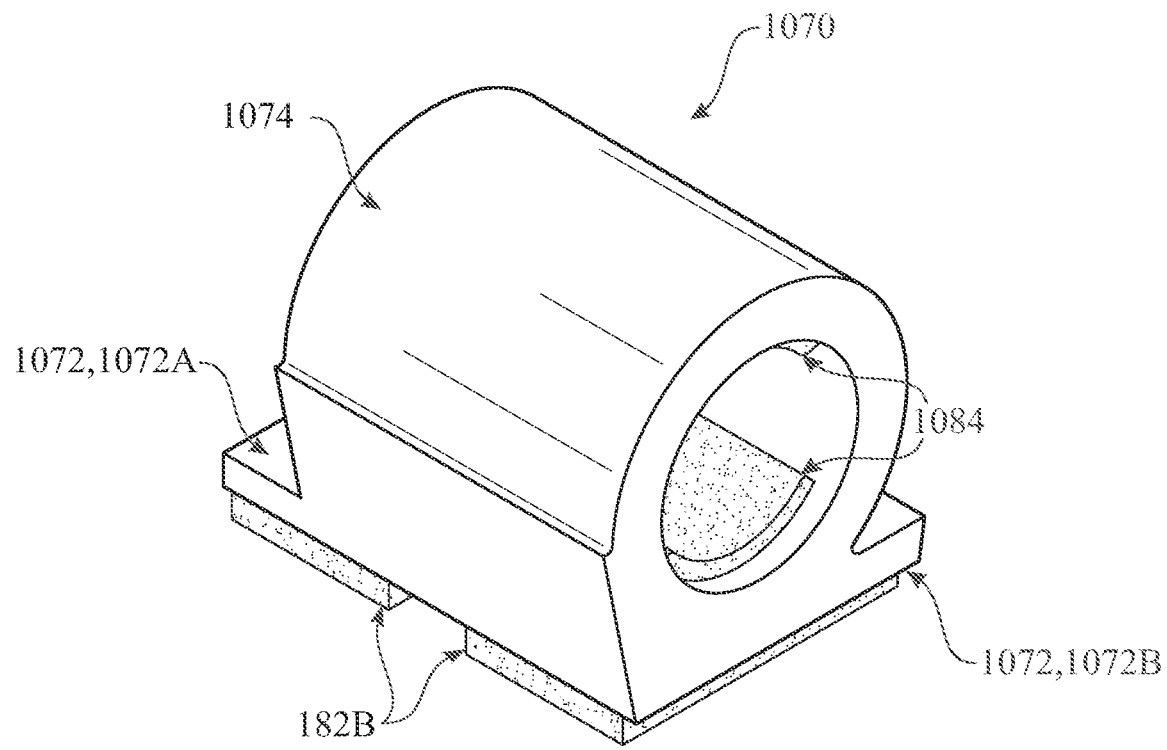
FIG. 22 presents a front perspective view of a laser pointer device mount of the laser pointer parking alignment apparatus shown at FIG. 21.
Figure 23:
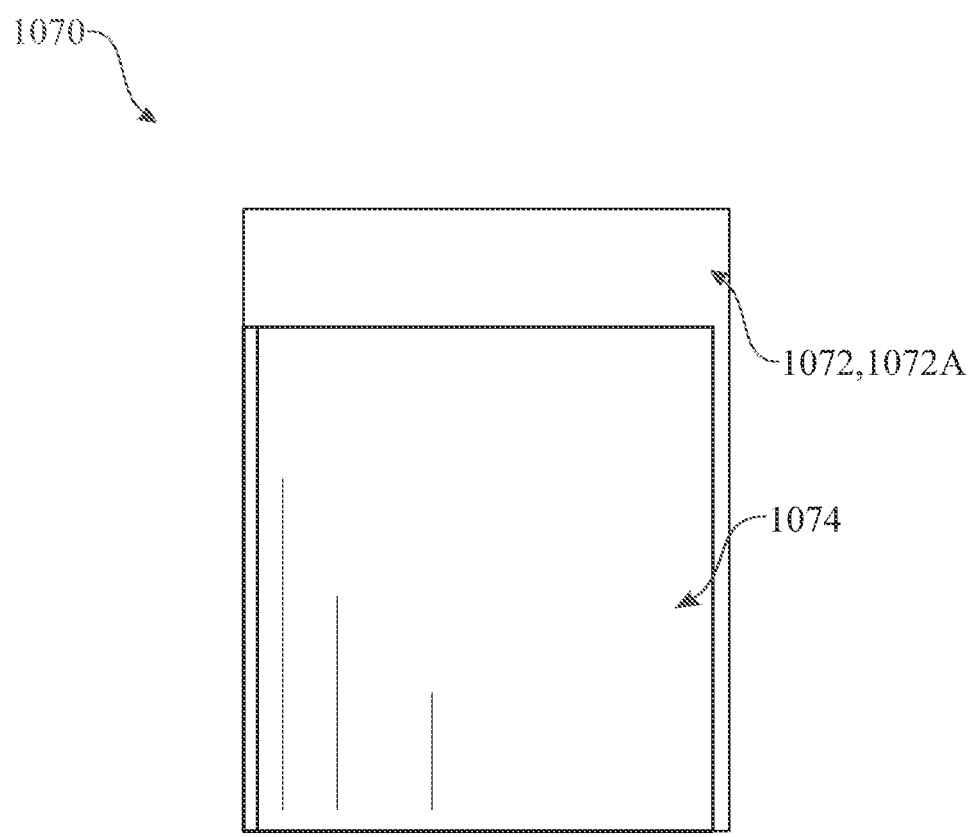
FIG. 23 presents a top plan view of the laser pointer device mount as shown at FIG. 22.
Figure 24:
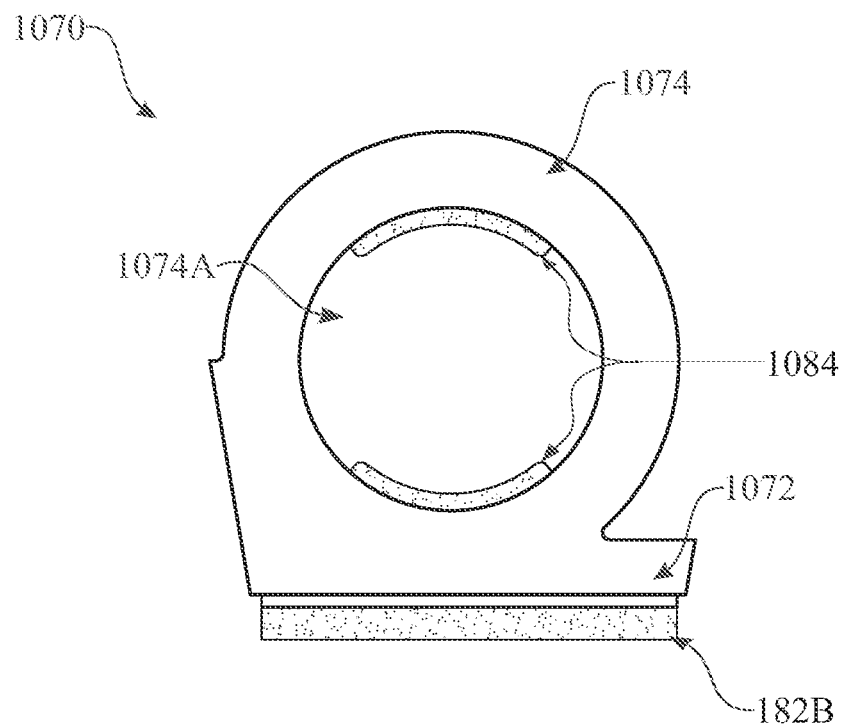
FIG. 24 presents a front view of the laser pointer device mount as shown at FIG. 22.
Figure 25:
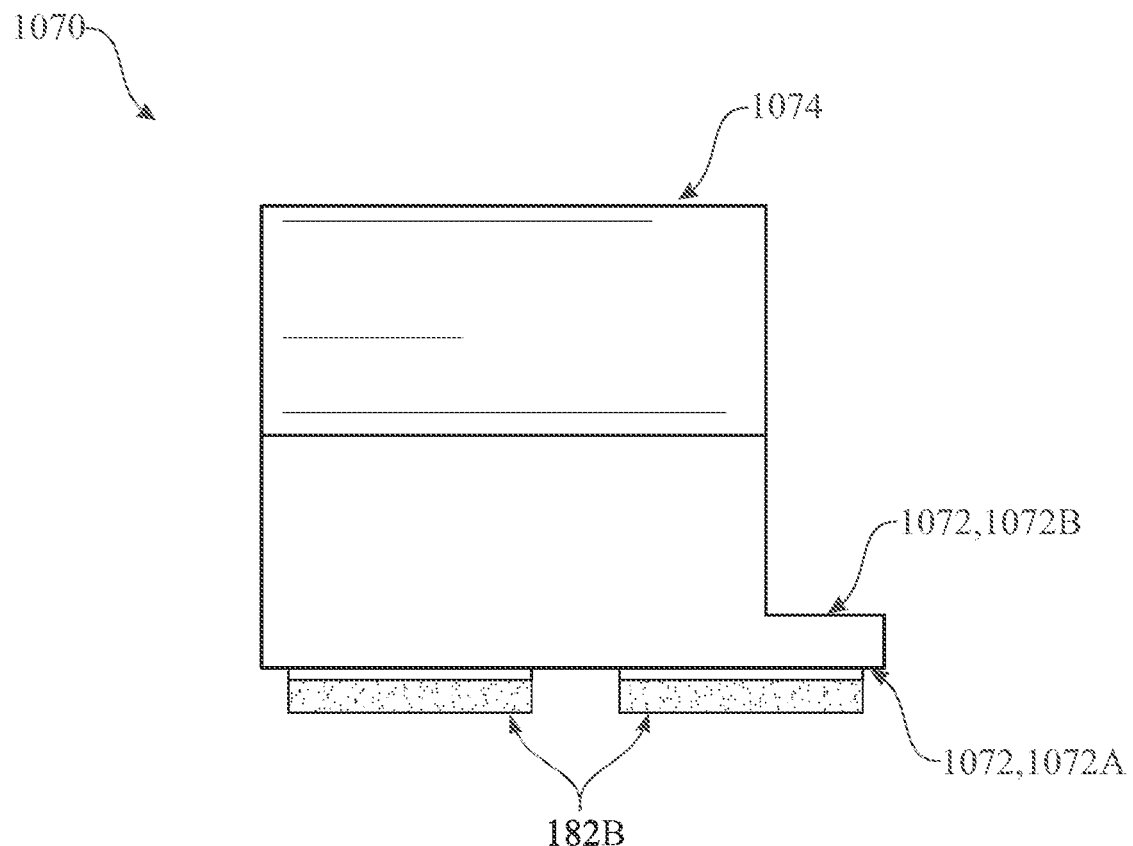
FIG. 25 presents a right side view of the laser pointer device mount of the laser pointer parking alignment apparatus illustrated in FIG. 21.

At least one insert 1084 may be affixed to an interior surface of the interior channel 1074A of the laser device holder 1074 to more securely hold the laser pointer device 130. As shown at FIGS. 22 and 24, the at least one insert 1084 may comprise a first insert and a second insert. The at least one insert 184 may comprise a loop element of a hook and loop assembly.

The laser device mount 1070 and its components may be made of any suitable materials, and fabricated by any suitable fabrication process. In one aspect, the laser device mount 1070 may be a single solid structure manufactured out of plastic, rubber, or foam. The mount base plate 1072 and the laser device holder 1074, whether integral or separate components, may be manufactured using 3D printing, injection modeling, or some other manufacturing process. The laser device base plate 1072 and the laser device holder 1074 may be a single component cast or machined of metal, alloys or the like.

The laser device holder 1074 may be integrally molded with the mount base 1072, or may be machined or cut into the device mount 1070. In some embodiments, the laser device holder 1074 may be mechanically secured to the mount base plate 1072, or secured thereto mechanically, such as, for example without limitation, by screws. The components of the laser device mount 1070 may be made of any suitable material, including but not limited to plastics, metals, alloys and blends.

The laser device mount 1070 may be mounted to the vehicle dash board by any suitable fixation means/device. As described herein, a fixation means/device configured for removable securement of the laser device mount to the vehicle dash board may be a hook and loop fastening assembly or the like, a nonlimiting example of which is a Velcro® brand hook and loop assembly. As shown at FIGS. 21, 22, 24 and 25, a second fixation device portion 182B is secured to the first bottom surface 1072A of the laser device mount base plate 1072.

Figure 26:
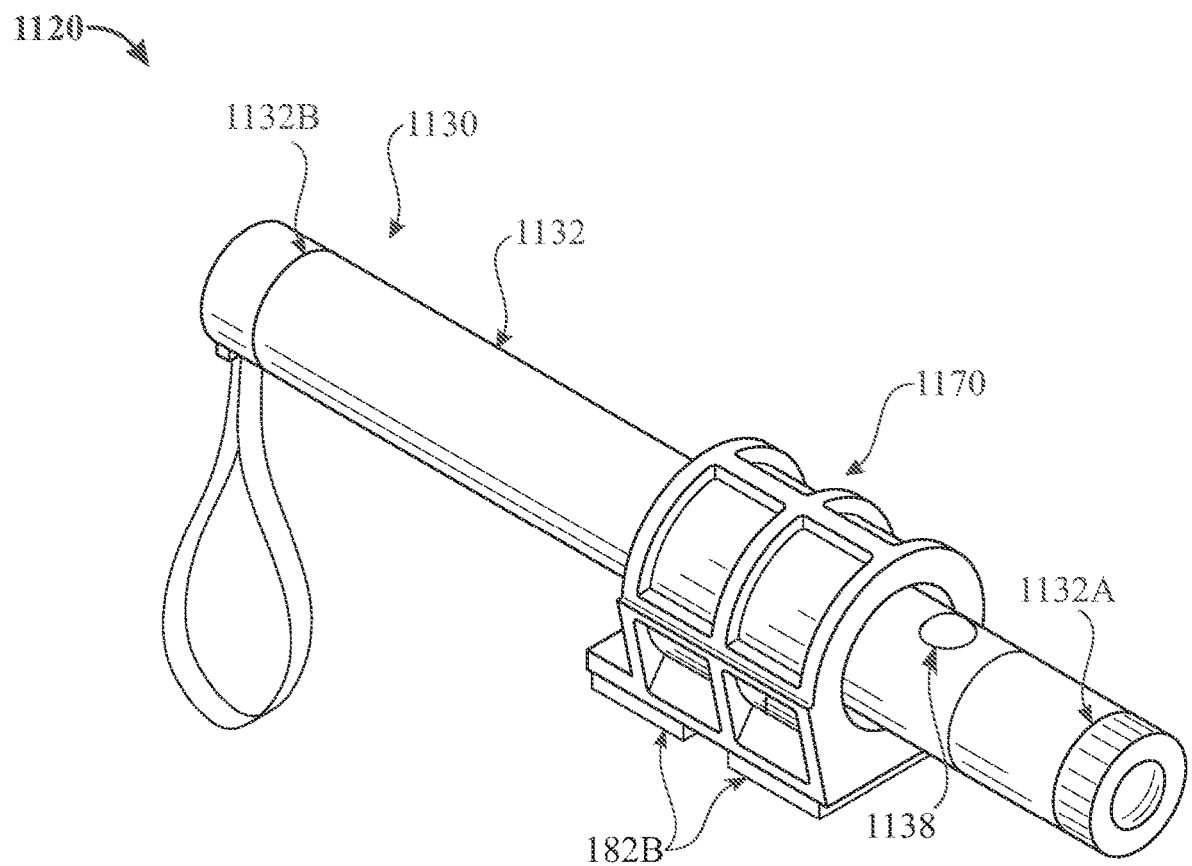
FIG. 26 presents a front perspective view of a laser pointer parking alignment apparatus in accordance with an illustrative embodiment of the present invention.

Referring next to FIG. 26, a laser pointer parking alignment apparatus 1120 which may be used or provided with a system 110 described herein, is shown in accordance with a fourth illustrative embodiment of the invention. Reference numerals which correspond to like elements of the apparatus 120 heretofore described with respect to FIGS. 1-20 and the apparatus 1020 heretofore described with respect to FIGS. 21-25 are designated by the same reference numerals in the 1100-1199 series in FIG. 26 and FIGS. 27-30 (which show further views of the laser device mount 1170 of the apparatus 1120).

Referring to FIG. 26, a laser pointer parking alignment apparatus 1120 which may be used with a system 110 described herein, comprises a laser pointer device 1130 removably securable in a laser device mount 1170. The laser device mount 1170 may be removably mounted on a vehicle dashboard 102 as shown and described herein. The laser device mount 1170 is configured for removable securement to a vehicle dashboard surface, and is configured to securely removably receive the laser pointer device 1130. The laser pointer device 1130 is capable of emitting a laser light beam.

The laser pointer device 1130 may be made of any suitable components by any suitable fabrication process. The laser pointer device 1130 may be any suitable commercially available laser pointer device, and may be as described herein. The laser pointer device 1130 may be AC and/or DC powered. The laser pointer device 1130 may have any suitable shape. In some embodiments, the laser pointer device 1130 may comprise a cylindrical or tubular housing 1132 with a first end 1132A and a second end 1132B with a power switch or button 1138. The laser pointer device 1130 is configured to be securely removably held in the laser device mount 1170. Further details regarding the laser pointer device 1030 are provided in the description of laser pointer device hereinabove with reference to FIGS. 1-7.

Referring to FIGS. 27-30, various views of the laser device mount 1170 are shown. The laser device mount 1170 may comprise a base plate 1172 and a laser device holder 1174 which may be connected or integrally formed. The base plate 1172 comprises a first bottom surface 1172A and a second top surface 1172B. The base plate 1172 may be any suitable shape that permits the base plate 1172 to be removably mounted to a vehicle dash board by affixing the first bottom surface 1172A of the base plate 1172 to the surface of the vehicle dash board.

The laser device holder 1174 is located on the second top surface 1172B of the base plate 1172. The laser device holder 1174 may have any suitable shape. For example without limitation, the laser device holder 1174 may comprise a collet, a chuck, a cylindrical tube or a tapered tube configured to receive and securely hold the laser pointer device housing 1132. The laser pointer device housing 1132 is configured to be securely held in an interior channel 1174A of the laser device holder 1174. The laser device holder 1174 may have a uniform inner diameter or a tapered inner diameter. In some embodiments, the laser device holder interior channel 1174A may have a first inner diameter at a first end that is equal to a second inner diameter at a second end. In other embodiments, the laser device holder interior channel 1174A may be tapered and may have a first inner diameter at the first end which is greater than a second inner diameter at the second end. In other embodiments, the laser device holder interior channel 1174A may be tapered and may have a first inner diameter at the first end which is less than the second inner diameter at the second end.

Figure 27:
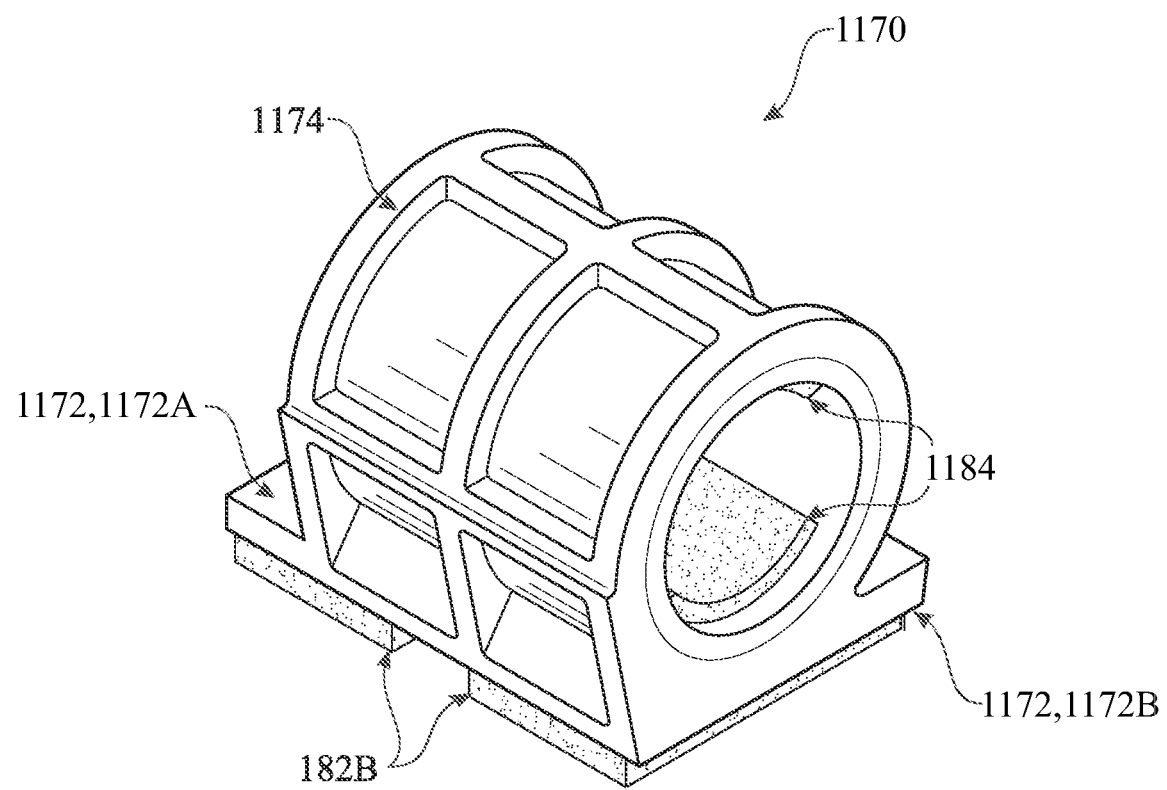
FIG. 27 presents a front perspective view of a laser pointer device mount of the laser pointer parking alignment apparatus shown at FIG. 26.
Figure 28:
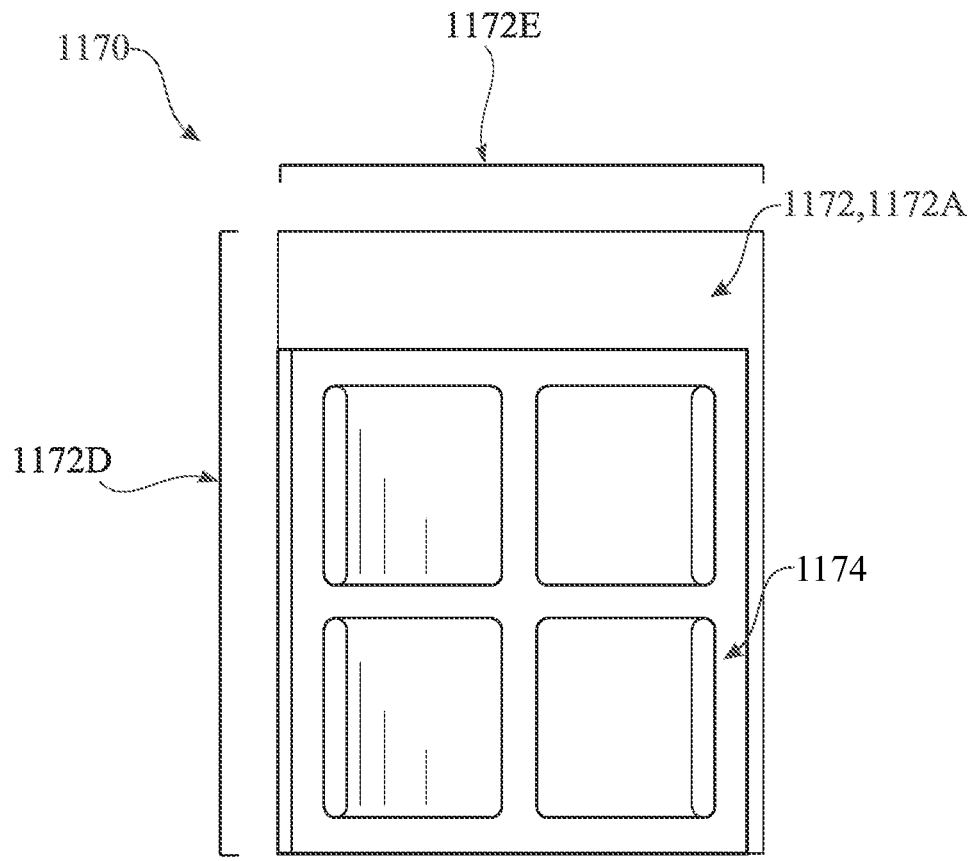
FIG. 28 presents a top plan view of the laser pointer device mount as shown at FIG. 27.
Figure 29:
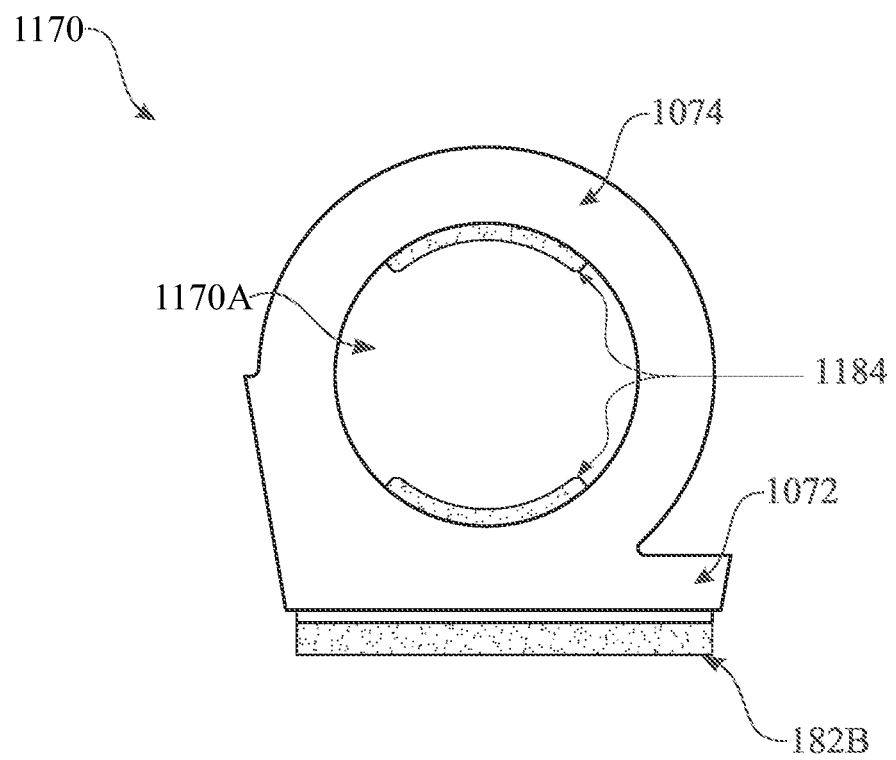
FIG. 29 presents a front view of the laser pointer device mount as shown at FIG. 27.
Figure 30:
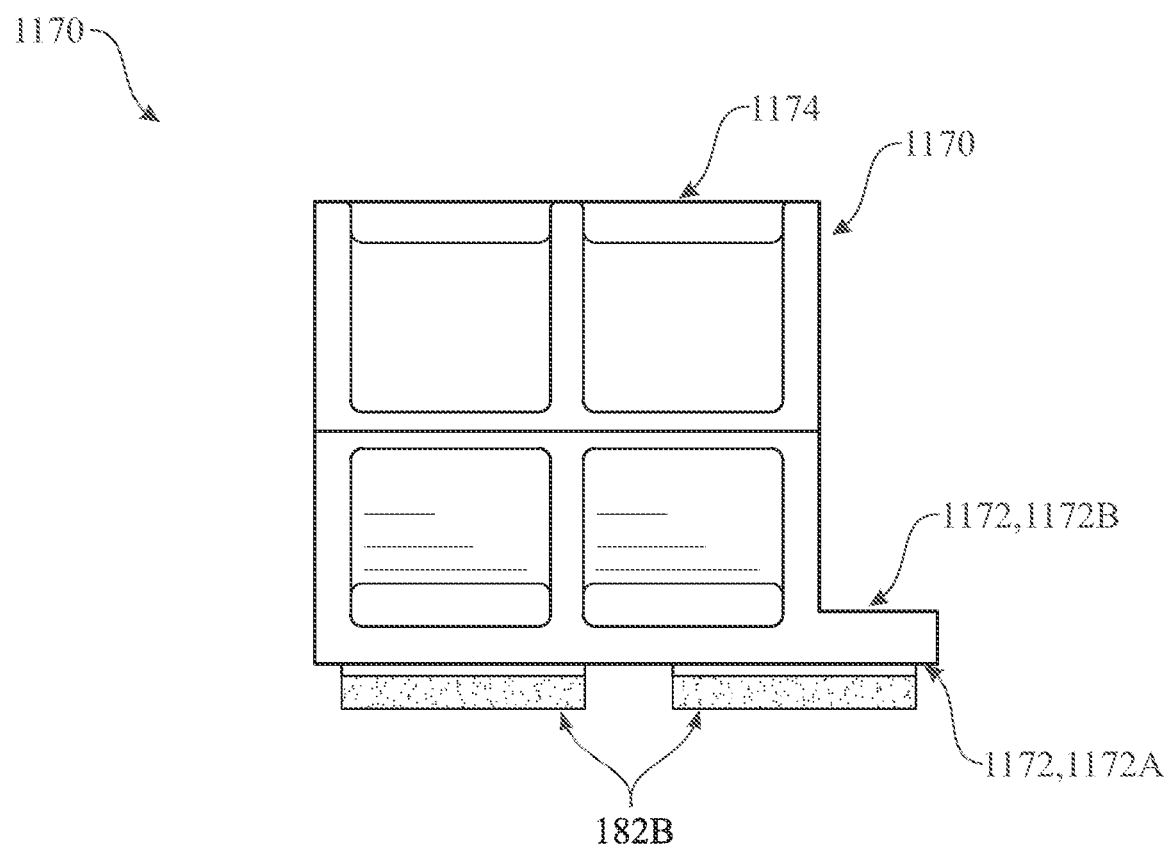
FIG. 30 presents a right side view of the laser pointer device mount illustrated in FIG. 27.

At least one insert 1184 may be affixed to an interior surface of the interior channel 1074A of the laser device holder 1074 to more securely hold the laser pointer device 130. As shown at FIGS. 27 and 29, the at least one insert 1184 may comprise a first insert and a second insert. The at least one insert 1184 may comprise a loop element of a hook and loop assembly.

The laser device mount 1170 and its components may be made of any suitable materials, and fabricated by any suitable fabrication process. In one aspect, the laser device mount 1170 may be a single solid structure manufactured out of plastic, rubber, or foam. The mount base plate 1172 and the laser device holder 1174, whether integral or separate components, may be manufactured using 3D printing, injection modeling, or some other manufacturing process. The laser device base plate 1172 and the laser device holder 1174 may be a single component cast or machined of metal, alloys or the like.

The laser device holder 1174 may be integrally molded with the mount base 1172, or may be machined or cut into the device mount 1170. In some embodiments, the laser device holder 1174 may be mechanically secured to the mount base plate 1172, or secured thereto mechanically, such as, for example without limitation, by screws. The components of the laser device mount 1170 may be made of any suitable material, including but not limited to plastics, metals, alloys and blends.

The laser device mount 1170 may be mounted to the vehicle dash board by any suitable fixation means/device. As described herein, a fixation means/device configured for removable securement of the laser device mount to the vehicle dash board may be a hook and loop fastening assembly or the like, a nonlimiting example of which is a Velcro® brand hook and loop assembly. As shown at FIGS. 26, 27, 29 and 30, a second fixation device portion 182B is secured to the first bottom surface 1172A of the laser device mount base plate 1172.

In some embodiments, the laser device mount base plate 1172 has a base plate length 1172D of between about 38-43 mm and a base plate width 1172E of between about 25-32 mm; the laser device holder 1174 may have a length of between about 30-36 mm; and the laser device holder interior channel 1174A may comprise an inner diameter (or first inner diameter and second inner diameter) of between about 20-28 mm. In some embodiments, the laser device mount base plate 1172 has a base plate length 1172D of 40.89 mm and a base plate width 1172E of 28.18 mm; the laser device holder 1174 has a length of 33.12 mm; and the laser device holder interior channel 1174A comprises an inner diameter of 24.11 mm.

In summary, the present invention provides a laser pointer parking alignment system comprising:
    a laser pointer parking alignment apparatus comprising:
        a laser pointer device capable of emitting a laser beam;
        a laser device mount configured for removable securement to a vehicle dashboard surface and configured to securely removably receive the laser pointer device on an upper surface thereof; and
        a fixation means for attaching the laser device mount to the dashboard, the fixation means being configured to for securement to a bottom surface of the laser device mount, and to the vehicle dashboard surface;
    a stationary target configured for removable securement to a surface of a structure, the stationary target having a surface capable of reflecting the laser beam for positioning the vehicle; and
    a series of system instructions for a user to follow to install, use and maintain the system.

In some embodiments the laser pointing parking alignment system is configured for use to calculate a center of a predetermined parking space and enable a vehicle operator to successfully enter the predetermined parking space with the vehicle centered in the predetermined parking space.

In some embodiments, the structure comprises a parking garage, and the surface of the structure comprises a garage wall.

In some embodiments, the laser pointer device is configured to be mounted to the vehicle dashboard and lined up with a midpoint of a middle portion of the garage wall; and aligning the vehicle comprises lining up the laser pointer device with the midpoint of the middle portion of the garage wall.

In some embodiments, the vehicle may be any suitable vehicle. The vehicle may be selected from a 2-door vehicle, a 4-door vehicle, a convertible, a compact, a sedan, a station wagon, an SUV, or a van.

In some embodiments, the laser pointer device comprises:
- a cylindrical or tubular housing having a first end and a second end;
- a removable first end cap comprising a lens cap configured to hold a laser lens through which a laser light beam may be conveyed from the laser pointer device;
- a removable second end cap having a cord loop configured to retain a cord extending therethrough;
- a laser light and a battery power source held in the housing, the laser light being operably connected to the battery power source; and
- a power switch or button operably connected to the laser light and the battery power source, which may be actuated to power on and off the laser pointer device.

In some embodiments, the power switch or button is located on the housing proximal to the first end thereof.

In some embodiments, the lens cap and the second end cap are configured for removable securement to the housing by a threaded connection. In other embodiments, the lens cap and the second end cap are configured for removable securement to the housing by a snap fit.

In some embodiments, the battery power source comprises a removable battery.

In other embodiments, the battery power source is a removable rechargeable battery; the second end cap further comprises a charging receptacle operably connected to the battery for recharging; and the system further comprises a recharging or power cord configured for connection at a first end to the charging receptacle and configured for connection at a second end to a vehicle power receptacle or an AC power supply for recharging or for power.

In some embodiments, the laser pointer parking alignment system further comprises at least one system digital display configured to display a distance between the vehicle and the stationary target located at the rear garage wall, whereby the system may provide front bumper protection to the vehicle. In other embodiments, the laser pointer parking alignment system further comprises at least one system digital display configured to display a right side distance from a right side view mirror of the vehicle to a right side wall of the garage and a left side distance from a left side view mirror of the vehicle to a left side wall of the garage, whereby the system may provide side mirror protection.

In some embodiments, the fixation means comprises a hook and loop fastening assembly; and the hook and loop fastening assembly further comprises a first fixation device portion configured for securement to an upper surface of the vehicle dash board and a second fixation device portion configured for securement to a first bottom surface of the laser device mount.

In some embodiments, the laser device mount comprises:
- a base plate comprising a first bottom surface and a second top surface, wherein the laser device mount is configured to be removably mounted to the vehicle dash board by affixing the first bottom surface of the base plate to the surface of the vehicle dash board; and
- a laser device holder supported by the second top surface of the base plate, the laser device holder comprising an interior channel configured to securely removably retain the laser pointer device.

In some embodiments, the laser device holder and the base plate are integrally formed and the laser device mount comprises a single solid structure.

In some embodiments, the laser device holder interior channel has a first inner diameter at a first end and a second inner diameter at a second end, and the first inner diameter is equal to the second inner diameter such that the interior channel has a uniform interior diameter.

In some embodiments, the laser device holder interior channel has a first inner diameter at a first end and a second inner diameter at a second end, and the first inner diameter is greater than the second inner diameter such that the interior channel comprises a tapered tube that is tapered inward from the first end to the second end.

In some embodiments, the laser device holder interior channel has a first inner diameter at a first end and a second inner diameter at a second end, and the first inner diameter is less than the second inner diameter such that the interior channel comprises a tapered tube that is tapered outward from the first end to the second end.

In some embodiments, the base plate of the laser device mount has a base plate length of between about 38-43 mm and a base plate width of between about 25-32 mm; the laser device holder has a laser device holder length of between about 30-36 mm; and the laser device holder interior channel has an inner diameter of between about 20-28 mm.

In some embodiments, the laser device mount base plate has a base plate length of 40.89 mm and a base plate width of 28.18 mm; the laser device holder has a length of 33.12 mm; and the laser device holder interior channel has an inner diameter of 24.11 mm.

In some embodiments, the present invention may provide a method comprising the following steps:
- providing and removably installing a laser device mount of the system in a vehicle, on a vehicle dashboard;
- providing and removably mounting a laser pointer device of the system on the laser device mount;
- determining a midline of a garage and marking the midline of the garage;
- determining a midpoint of a targeted back garage wall along the midline and marking the midpoint with a stationary target;
- powering on the laser pointer device; and
- aligning the vehicle and parking the vehicle by driving the vehicle into the garage space from the aligned position.

In some embodiments, the present invention may provide a method comprising the following steps:
- providing the laser pointer parking alignment system as described herein;
- installing a laser pointer apparatus of the system on a vehicle dashboard;
- determining a center line of a garage and a center point of a rear wall of the garage;

marking the center line of the garage and marking the center point of the garage with a stationary target;

powering on the laser pointer device and aligning the pointer device with the midline of the garage and the midpoint of the garage; and aligning the laser pointer device with the midpoint of the garage wall to center the vehicle in the garage while parking the vehicle.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A laser pointer parking alignment system, configured to facilitate positioning a vehicle within a parking space, the parking space defined by a structure and accessible by the vehicle through a vehicle access opening, the laser pointer parking alignment system comprising:
    a stationary target, removably secured to a midpoint of a surface of the structure arranged opposite to the vehicle access opening, said midpoint positioned on a vertical plane extending perpendicularly from the access opening and into the parking space, the vertical plane containing a midline of the vehicle access opening; and
    a laser pointer parking alignment apparatus comprising:
        a laser device mount removably secured to a vehicle dashboard surface,
        a fixation means attaching the laser device mount to the vehicle dashboard surface, the fixation means being secured to a bottom surface of the laser device mount and to the vehicle dashboard surface, and
        a laser pointer device removably carried by the laser device mount and configured to emit a laser beam extending frontward of the vehicle and along a central, front-to-back, longitudinal direction of the vehicle, wherein, with the vehicle positioned outside the parking space, facing the vehicle access opening and centered with respect to the vehicle access opening, the laser beam is arranged along said imaginary plane and reflects on a surface of the stationary target; and
    a series of system instructions for a user to follow to install, use and maintain the system.

2. The laser pointer parking alignment system of claim 1, wherein the structure comprises a parking garage, and the surface of the structure comprises a garage wall.

3. The laser pointer parking alignment system of claim 1, wherein the vehicle is selected from a 2-door vehicle, a 4-door vehicle, a convertible, a compact, a sedan, a station wagon, an SUV, or a van.

4. The laser parking alignment system of claim 1, wherein the laser pointer device comprises:
    a cylindrical or tubular housing having a first end and a second end;
    a removable first end cap comprising a lens cap configured to hold a laser lens through which a laser light beam may be conveyed from the laser pointer device;
    a removable second end cap having a cord loop configured to retain a cord extending therethrough;
    a laser light and a battery power source held in the housing, the laser light being operably connected to the battery power source; and
    a power switch or button operably connected to the laser light and the battery power source, which may be actuated to power on and off the laser pointer device.

5. The laser parking alignment system of claim 4 wherein the power switch or button is located on the housing proximal to the first end thereof.

6. The laser parking alignment system of claim 4 wherein the lens cap and the second end cap are configured for removable securement to the housing by a threaded connection.

7. The laser parking alignment system of claim 4 wherein the lens cap and the second end cap are configured for removable securement to the housing by a snap fit.

8. The laser parking alignment system of claim 4 wherein the battery power source comprises a removable battery.

9. The laser parking alignment system of claim 5 wherein:
    the battery power source is a removable rechargeable battery;
    the second end cap further comprises a charging receptacle operably connected to the battery for recharging; and
    the system further comprises a recharging or power cord configured for connection at a first end to the charging receptacle and configured for connection at a second end to a vehicle power receptacle or an AC power supply for recharging or for power.

10. The laser pointer parking alignment system of claim 4 further comprising at least one system digital display is configured to display a distance between the vehicle and the stationary target located at the rear garage wall, whereby the system may provide front bumper protection to the vehicle.

11. The laser pointer parking alignment system of claim 4 further comprising at least one system digital display is configured to display a right side distance from a right side view mirror of the vehicle to a right side wall of the garage and a left side distance from a left side view mirror of the vehicle to a left side wall of the garage, whereby the system may provide side mirror protection.

12. The laser parking alignment system of claim 4 wherein:
    the fixation means comprises a hook and loop fastening assembly; and
    the hook and loop fastening assembly further comprises a first fixation device portion configured for securement to an upper surface of the vehicle dash board and a second fixation device portion configured for securement to a first bottom surface of the laser device mount.

13. The laser parking alignment system of claim 12 wherein:
    the laser device mount comprises:
        a base plate comprising a first bottom surface and a second top surface, wherein the laser device mount is configured to be removably mounted to the vehicle dash board by affixing the first bottom surface of the base plate to the surface of the vehicle dash board; and
        a laser device holder supported by the second top surface of the base plate, the laser device holder comprising an interior channel configured to securely removably retain the laser pointer device.

14. The laser parking alignment system of claim 13 wherein the laser device holder and the base plate are integrally formed and the laser device mount comprises a single solid structure.

15. The laser parking alignment system of claim 13 wherein the laser device holder interior channel has a first inner diameter at a first end and a second inner diameter at a second end, and the first inner diameter is equal to the second inner diameter such that the interior channel has a uniform interior diameter.

16. The laser parking alignment system of claim 13 wherein the laser device holder interior channel has a first inner diameter at a first end and a second inner diameter at a second end, and the first inner diameter is greater than the second inner diameter such that the interior channel comprises a tapered tube that is tapered inward from the first end to the second end.

17. The laser parking alignment system of claim 13 wherein the laser device holder interior channel has a first inner diameter at a first end and a second inner diameter at a second end, and the first inner diameter is less than the second inner diameter such that the interior channel comprises a tapered tube that is tapered outward from the first end to the second end.

18. The laser parking alignment system of claim 13 wherein:
the base plate of the laser device mount has a base plate length of between about 38-43 mm and a base plate width of between about 25-32 mm;
the laser device holder has a laser device holder length of between about 30-36 mm; and
the laser device holder interior channel has an inner diameter of between about 20-28 mm.

19. The laser parking alignment system of claim 18 wherein:
the laser device mount base plate has a base plate length of 40.89 mm and a base plate width of 28.18 mm;
the laser device holder has a length of 33.12 mm; and
the laser device holder interior channel has an inner diameter of 24.11 mm.

20. A laser pointer parking alignment system, configured to facilitate positioning a vehicle within a parking space, the parking space defined by a structure and accessible by the vehicle through a vehicle access opening, the laser pointer parking alignment system comprising:
a stationary target, removably secured to a midpoint of a surface of the structure arranged opposite to the vehicle access opening, said midpoint positioned on a vertical plane extending perpendicularly from the access opening and into the parking space, the vertical plane containing a midline of the vehicle access opening; and
a laser pointer parking alignment apparatus comprising:
a laser device mount removably secured to a vehicle dashboard surface,
a fixation means attaching the laser device mount to the vehicle dashboard surface, the fixation means being secured to a bottom surface of the laser device mount and to the vehicle dashboard surface, and
a laser pointer device removably carried by the laser device mount and configured to emit a laser beam frontward of the vehicle, the laser beam extending along a central, front-to-back, longitudinal direction of the vehicle and such that, with the vehicle positioned outside the parking space, facing the vehicle access opening and centered with respect to the vehicle access opening, the laser beam is arranged along said imaginary plane and reflects on a surface of the stationary target.

\* \* \* \* \*